US011405914B2

(12) United States Patent
Zeng et al.

(10) Patent No.: US 11,405,914 B2
(45) Date of Patent: Aug. 2, 2022

(54) WAVEFORM SELECTION IN WIRELESS COMMUNICATIONS

(71) Applicant: QUALCOMM Incorporated, San Diego, CA (US)

(72) Inventors: Wei Zeng, San Diego, CA (US); Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/612,762

(22) Filed: Jun. 2, 2017

(65) Prior Publication Data

US 2018/0092095 A1 Mar. 29, 2018

Related U.S. Application Data

(60) Provisional application No. 62/400,086, filed on Sep. 26, 2016.

(51) Int. Cl.
*H04W 72/04* (2009.01)
*H04W 88/06* (2009.01)
(Continued)

(52) U.S. Cl.
CPC ......... *H04W 72/0453* (2013.01); *H04L 5/001* (2013.01); *H04L 5/0007* (2013.01);
(Continued)

(58) Field of Classification Search
CPC .............................. H04W 8/24; H04W 72/042
See application file for complete search history.

(56) References Cited

U.S. PATENT DOCUMENTS

| 8,649,307 B1* | 2/2014 | Dick | H04L 5/0023 370/311 |
| 2010/0034152 A1* | 2/2010 | Imamura | H04L 5/0007 370/329 |

(Continued)

FOREIGN PATENT DOCUMENTS

| CN | 101730981 A | 6/2010 |
| EP | 2979377 A2 | 2/2016 |

(Continued)

OTHER PUBLICATIONS

ISA/EP, International Search Report and Written Opinion of the International Searching Authority, Int'l Application No. PCT/US2017/051843, dated Nov. 29, 2017, European Patent Office, Rijswijk, NL, 15 pgs.

(Continued)

*Primary Examiner* — Hoon J Chung
(74) *Attorney, Agent, or Firm* — Qualcomm Incorporated

(57) ABSTRACT

Techniques are described that provide for waveform selection for uplink (UL) and/or downlink (DL) wireless transmissions based on one or more factors associated with the wireless transmission, a transmitter that is to transmit the wireless transmission, or combinations thereof. UL and DL transmissions may use one of a number of different waveforms, such as single-carrier waveforms that use a single carrier for information transmission of a wireless channel, and multi-carrier waveforms that use multiple carriers at different frequencies to transmit some of the bits on each channel. Multi-carrier transmission waveforms or single-carrier waveforms may be selected for wireless transmissions based on a bandwidth allocated for the transmissions, a capability of a transmitter that is to transmit the transmissions, or combinations thereof.

8 Claims, 18 Drawing Sheets

(51) Int. Cl.
*H04L 27/26* (2006.01)
*H04L 5/00* (2006.01)
*H04L 5/14* (2006.01)
*H04L 27/00* (2006.01)

(52) U.S. Cl.
CPC .......... *H04L 5/0064* (2013.01); *H04L 5/0091* (2013.01); *H04L 5/1453* (2013.01); *H04L 27/0012* (2013.01); *H04L 27/2646* (2013.01); *H04L 27/2666* (2013.01); *H04W 72/042* (2013.01); *H04W 88/06* (2013.01); *H04L 27/2636* (2013.01)

(56) References Cited

U.S. PATENT DOCUMENTS

| | | |
|---|---|---|
| 2010/0067591 A1 | 3/2010 | Luo et al. |
| 2012/0243450 A1* | 9/2012 | Ishii ............... H04L 5/0091 370/281 |
| 2013/0322370 A1 | 12/2013 | Fong et al. |
| 2014/0293987 A1 | 10/2014 | Zhu et al. |
| 2015/0282008 A1 | 10/2015 | Cao et al. |
| 2016/0174179 A1 | 6/2016 | Seo et al. |
| 2017/0208455 A1* | 7/2017 | Au ........................ H04W 76/10 |
| 2020/0305038 A1* | 9/2020 | Tooher ............. H04W 36/0069 |

FOREIGN PATENT DOCUMENTS

| WO | WO-2013181483 A2 | 12/2013 |
|---|---|---|
| WO | 2017124720 A1 | 7/2017 |

OTHER PUBLICATIONS

Qualcomm Incorporated: "OFDM and SC-FDM Support for Uplink", 3GPP TSG-RAN WG1 #86, R1-166354, Aug. 22-26, 2016 Gothenburg, Sweden, pp. 1-6.

* cited by examiner

WAVEFORM SELECTION IN WIRELESS COMMUNICATIONS

CROSS REFERENCES

The present Application for Patent claims priority to U.S. Provisional Patent Application No. 62/400,086 by Zeng, et al., entitled "Waveform Selection in Wireless Communications," filed Sep. 26, 2016, assigned to the assignee hereof, and is hereby expressly incorporated by reference herein in its entirety.

INTRODUCTION

The following relates generally to wireless communication, and more specifically to waveform selection in wireless communications based on user equipment (UE) capability, transmission bandwidth, or combinations thereof.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (radio heads (RHs)) in communication with a number of access node controllers (ANCs), where a set of one or more RHs, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

As communications providers continue to increase the capacity of wireless networks, and as demand for such capacity grows, efficient use of wireless resources becomes increasingly important for high quality and relatively low cost wireless communications. Efficient use of wireless resources may include providing available wireless resources and coordinating communications in a manner that allows each UE being served to efficiently utilize network resources and enhance user experience.

SUMMARY

A method of wireless communication is described. The method may include receiving a radio frequency (RF) capability indication from a UE, selecting a multi-carrier waveform or a single-carrier waveform for a wireless transmission between the UE and the base station, and transmitting an indication of the selected waveform to the UE.

An apparatus for wireless communication is described. The apparatus may include means for receiving a RF capability indication from a UE, means for selecting a multi-carrier waveform or a single-carrier waveform for a wireless transmission between the UE and the base station, and means for transmitting an indication of the selected waveform to the UE.

Another apparatus for wireless communication is described. The apparatus may include a processor, memory in electronic communication with the processor, and instructions stored in the memory. The instructions may be operable to cause the processor to receive a RF capability indication from a UE, select a multi-carrier waveform or a single-carrier waveform for a wireless transmission between the UE and the base station, and transmit an indication of the selected waveform to the UE.

A non-transitory computer readable medium for wireless communication is described. The non-transitory computer-readable medium may include instructions operable to cause a processor to receive a RF capability indication from a UE, select a multi-carrier waveform or a single-carrier waveform for a wireless transmission between the UE and the base station, and transmit an indication of the selected waveform to the UE.

A method of wireless communication at a base station is described. The method may include receiving a RF capability indication from a UE, identifying a bandwidth for a wireless transmission between the UE and the base station, selecting a waveform for the wireless transmission between the UE and the base station based at least in part on the RF capability indication or the bandwidth, or both, and transmitting an indication of the selected waveform to the UE.

Another apparatus for wireless communication is described. The apparatus may include a processor, memory in electronic communication with the processor. The processor and memory configured to receive a RF capability indication from a UE, identify a bandwidth for a wireless transmission between the UE and the apparatus, select a waveform for the wireless transmission between the UE and the apparatus based at least in part on the RF capability indication or the bandwidth, or both, and transmit an indication of the selected waveform to the UE.

In some examples of the method, apparatus, and non-transitory computer-readable medium described above, the waveform comprises a multi-carrier waveform or a single-carrier waveform. In some examples of the method, apparatus, and non-transitory computer-readable medium described above, the wireless transmission is an UL transmission and the waveform selection is performed independently of a waveform of a DL transmission.

Some examples of the method, apparatus, and non-transitory computer-readable medium described above may further include processes, features, means, or instructions for receiving the wireless transmission from the UE using the selected waveform. Some examples of the method, apparatus, and non-transitory computer-readable medium described above may further include processes, features, means, or instructions for transmitting the wireless transmission to the UE using the selected waveform.

In some examples of the method, apparatus, and non-transitory computer-readable medium described above, the RF capability indication indicates a single-carrier bandwidth capability of the UE. Some examples of the method, apparatus, and non-transitory computer-readable medium described above may further include processes, features, means, or instructions for identifying a bandwidth for the wireless transmission. Some examples of the method, apparatus, and non-transitory computer-readable medium described above may further include processes, features, means, or instructions for determining that the bandwidth for the wireless transmission exceeds the single-carrier bandwidth capability of the UE, and selecting the multi-carrier waveform responsive to the determining.

In some examples of the method, apparatus, and non-transitory computer-readable medium described above, the RF capability indication indicates that the UE is to use carrier aggregation (CA) for transmission of the wireless transmission, and wherein the multi-carrier waveform may be selected based at least in part on the indication of CA.

Some examples of the method, apparatus, and non-transitory computer-readable medium described above may further include processes, features, means, or instructions for identifying a bandwidth for the wireless transmission, selecting the multi-carrier waveform when the bandwidth for the wireless transmission exceeds a threshold value, and selecting the single-carrier waveform when the bandwidth for the wireless transmission does not exceed the threshold value.

Some examples of the method, apparatus, and non-transitory computer-readable medium described above may further include processes, features, means, or instructions for identifying one or more of a signal-to-noise ratio (SNR) for the UE, a transmission mode (TM) of the wireless transmission, or a modulation-and-coding scheme (MCS) of the wireless transmission, and selecting the multi-carrier waveform based at least in part on the SNR, TM, MCS, or any combination thereof.

In some examples of the method, apparatus, and non-transitory computer-readable medium described above, the single-carrier waveform comprises a discrete Fourier transform (DFT) spread orthogonal frequency division multiplexing (DFT-s-OFDM) waveform, or any non-IFFT-based single carrier waveform. In some examples of the method, apparatus, and non-transitory computer-readable medium described above, the multi-carrier waveform comprises an orthogonal frequency division multiplexing (OFDM) waveform.

A method of wireless communication is described. The method may include transmitting a RF capability indication to a base station, receiving an indication of whether an UL transmission to the base station is to be transmitted using a multi-carrier waveform or a single-carrier waveform, and transmitting the wireless transmission using the indicated multi-carrier waveform or single carrier waveform.

Another method of wireless communication at a UE is described. The method may include transmitting a RF capability indication to a base station, receiving in response to the RF capability indication, from the base station, an indication of a waveform or a bandwidth, or both for a wireless transmission between the UE and the base station, identifying a waveform for the wireless transmission based at least in part on the indication of the waveform or the bandwidth, or both, and performing the wireless transmission using the identified waveform.

An apparatus for wireless communication is described. The apparatus may include means for transmitting a RF capability indication to a base station, means for receiving an indication of whether an UL transmission to the base station is to be transmitted using a multi-carrier waveform or a single-carrier waveform, and means for transmitting the UL transmission using the indicated multi-carrier waveform or single carrier waveform.

Another apparatus for wireless communication is described. The apparatus may include a processor, memory in electronic communication with the processor, and instructions stored in the memory. The instructions may be operable to cause the processor to transmit a RF capability indication to a base station, receive an indication of whether an UL transmission to the base station is to be transmitted using a multi-carrier waveform or a single-carrier waveform, and performing the wireless transmission using the identified waveform.

Another apparatus for wireless communication is described. The apparatus may include a processor, memory in electronic communication with the processor. The processor and memory configured to transmit a RF capability indication to a base station, receive in response to the RF capability indication, from the base station, an indication of a waveform or a bandwidth, or both for a wireless transmission between the apparatus and the base station, identify a waveform for the wireless transmission based at least in part on the indication of the waveform or the bandwidth, or both, and transmit the wireless transmission using the identified waveform.

A non-transitory computer readable medium for wireless communication is described. The non-transitory computer-readable medium may include instructions operable to cause a processor to transmit a RF capability indication to a base station, receive an indication of whether an UL transmission to the base station is to be transmitted using a multi-carrier waveform or a single-carrier waveform, and transmit a UL transmission using the indicated multi-carrier waveform or single carrier waveform.

In some examples of the method, apparatus, and non-transitory computer-readable medium described above, the waveform comprises a multi-carrier waveform or a single-carrier waveform. In some examples of the method, apparatus, and non-transitory computer-readable medium described above, the waveform is based at least in part on the RF capability indication.

Some examples of the method, apparatus, and non-transitory computer-readable medium described above may further include processes, features, means, or instructions for receiving the wireless transmission from the base station using the identified waveform or transmitting the wireless transmission to the base station using the identified waveform. In some examples of the method, apparatus, and non-transitory computer-readable medium described above, the RF capability indication indicates a single-carrier bandwidth capability of the UE, or a capability of the UE to use carrier aggregation for transmission of an uplink transmission, or a combination thereof.

In some examples of the method, apparatus, and non-transitory computer-readable medium described above, the RF capability indication indicates a single-carrier bandwidth capability of the UE. In some examples of the method, apparatus, and non-transitory computer-readable medium described above, the RF capability indication indicates that the UE is to use CA for transmission of the UL transmission.

Some examples of the method, apparatus, and non-transitory computer-readable medium described above may further include processes, features, means, or instructions for identifying one or more of a SNR for the UE, a TM of the UL transmission, or a MCS of the UL transmission. Some examples of the method, apparatus, and non-transitory computer-readable medium described above may further include processes, features, means, or instructions for transmitting the identified SNR, TM, or MCS to the base station.

In some examples of the method, apparatus, and non-transitory computer-readable medium described above, the single-carrier waveform comprises a DFT-s-OFDM waveform or any non-IFFT-based single carrier waveform. In some examples of the method, apparatus, and non-transitory computer-readable medium described above, the multi-carrier waveform comprises an OFDM waveform.

A method of wireless communication is described. The method may include identifying a bandwidth for a wireless transmission between a UE and the base station, selecting a multi-carrier waveform or a single-carrier waveform for the wireless transmission based at least in part on the identified bandwidth for the wireless transmission, and transmitting an indication of the selected waveform to the UE.

An apparatus for wireless communication is described. The apparatus may include means for identifying a bandwidth for a wireless transmission between a UE and the base station, means for selecting a multi-carrier waveform or a single-carrier waveform for the wireless transmission based at least in part on the identified bandwidth for the wireless transmission, and means for transmitting an indication of the selected waveform to the UE.

Another apparatus for wireless communication is described. The apparatus may include a processor, memory in electronic communication with the processor, and instructions stored in the memory. The instructions may be operable to cause the processor to identify a bandwidth for a wireless transmission between a UE and the base station, select a multi-carrier waveform or a single-carrier waveform for the wireless transmission based at least in part on the identified bandwidth for the wireless transmission, and transmit an indication of the selected waveform to the UE.

A non-transitory computer readable medium for wireless communication is described. The non-transitory computer-readable medium may include instructions operable to cause a processor to identify a bandwidth for a wireless transmission between a UE and the base station, select a multi-carrier waveform or a single-carrier waveform for the wireless transmission based at least in part on the identified bandwidth for the wireless transmission, and transmit an indication of the selected waveform to the UE.

In some examples of the method, apparatus, and non-transitory computer-readable medium described above, the wireless transmission is an UL transmission and the waveform selection is performed independently of a waveform of a DL transmission. Some examples of the method, apparatus, and non-transitory computer-readable medium described above may further include processes, features, means, or instructions for receiving the wireless transmission from the UE using the selected waveform. Some examples of the method, apparatus, and non-transitory computer-readable medium described above may further include processes, features, means, or instructions for transmitting the wireless transmission to the UE using the selected waveform.

In some examples of the method, apparatus, and non-transitory computer-readable medium described above, the RF capability indication indicates a single-carrier bandwidth capability of the UE, or a capability of the UE to use CA for transmission of the UL transmission, or a combination thereof.

Some examples of the method, apparatus, and non-transitory computer-readable medium described above may further include processes, features, means, or instructions for determining that the bandwidth comprises two or more component carriers (CCs), and identifying a multi-carrier waveform based at least in part on the determining. Some examples of the method, apparatus, and non-transitory computer-readable medium described above may further include processes, features, means, or instructions for identifying a multi-carrier waveform based at least in part on the bandwidth exceeding a threshold. Some examples of the method, apparatus, and non-transitory computer-readable medium described above may further include processes, features, means, or instructions for identifying a multi-carrier waveform based at least in part on the bandwidth exceeding the RF capability.

Some examples of the method, apparatus, and non-transitory computer-readable medium described above may further include processes, features, means, or instructions for receiving a RF capability indication from the UE, and wherein the selecting the multi-carrier waveform or a single-carrier waveform may be based at least in part on the RF capability indication.

In some examples of the method, apparatus, and non-transitory computer-readable medium described above, the RF capability indication indicates a single-carrier bandwidth capability of the UE, it is determined whether the bandwidth for the wireless transmission exceeds the single-carrier bandwidth capability of the UE, and the multi-carrier waveform or single-carrier waveform is selected responsive to the determination.

In some examples of the method, apparatus, and non-transitory computer-readable medium described above, the RF capability indication indicates that the UE is to use CA for transmission of the wireless transmission, and the multi-carrier waveform may be selected based at least in part on the indication of CA.

A method of wireless communication is described. The method may include receiving, from a base station, an indication of a bandwidth for a wireless transmission between the UE and the base station and identifying a multi-carrier waveform or a single-carrier waveform for the wireless transmission based at least in part on the indication of the bandwidth for the wireless transmission.

An apparatus for wireless communication is described. The apparatus may include means for receiving, from a base station, an indication of a bandwidth for a wireless transmission between the UE and the base station and means for identifying a multi-carrier waveform or a single-carrier waveform for the wireless transmission based at least in part on the indication of the bandwidth for the wireless transmission.

Another apparatus for wireless communication is described. The apparatus may include a processor, memory in electronic communication with the processor, and instructions stored in the memory. The instructions may be operable to cause the processor to receive, from a base station, an indication of a bandwidth for a wireless transmission between the UE and the base station and identify a multi-carrier waveform or a single-carrier waveform for the wireless transmission based at least in part on the indication of the bandwidth for the wireless transmission.

A non-transitory computer readable medium for wireless communication is described. The non-transitory computer-readable medium may include instructions operable to cause a processor to receive, from a base station, an indication of a bandwidth for a wireless transmission between the UE and the base station and identify a multi-carrier waveform or a single-carrier waveform for the wireless transmission based at least in part on the indication of the bandwidth for the wireless transmission.

Some examples of the method, apparatus, and non-transitory computer-readable medium described above may further include processes, features, means, or instructions for transmitting a RF capability indication to the base station, and the identification of the multi-carrier waveform or a single-carrier waveform may be based at least in part on the RF capability indication. In some examples of the method, apparatus, and non-transitory computer-readable medium described above, the RF capability indication indicates one or more of a single-carrier bandwidth capability of the UE, or that the UE may be to use CA for transmission of the wireless transmission.

DETAILED DESCRIPTION

Figure 1:
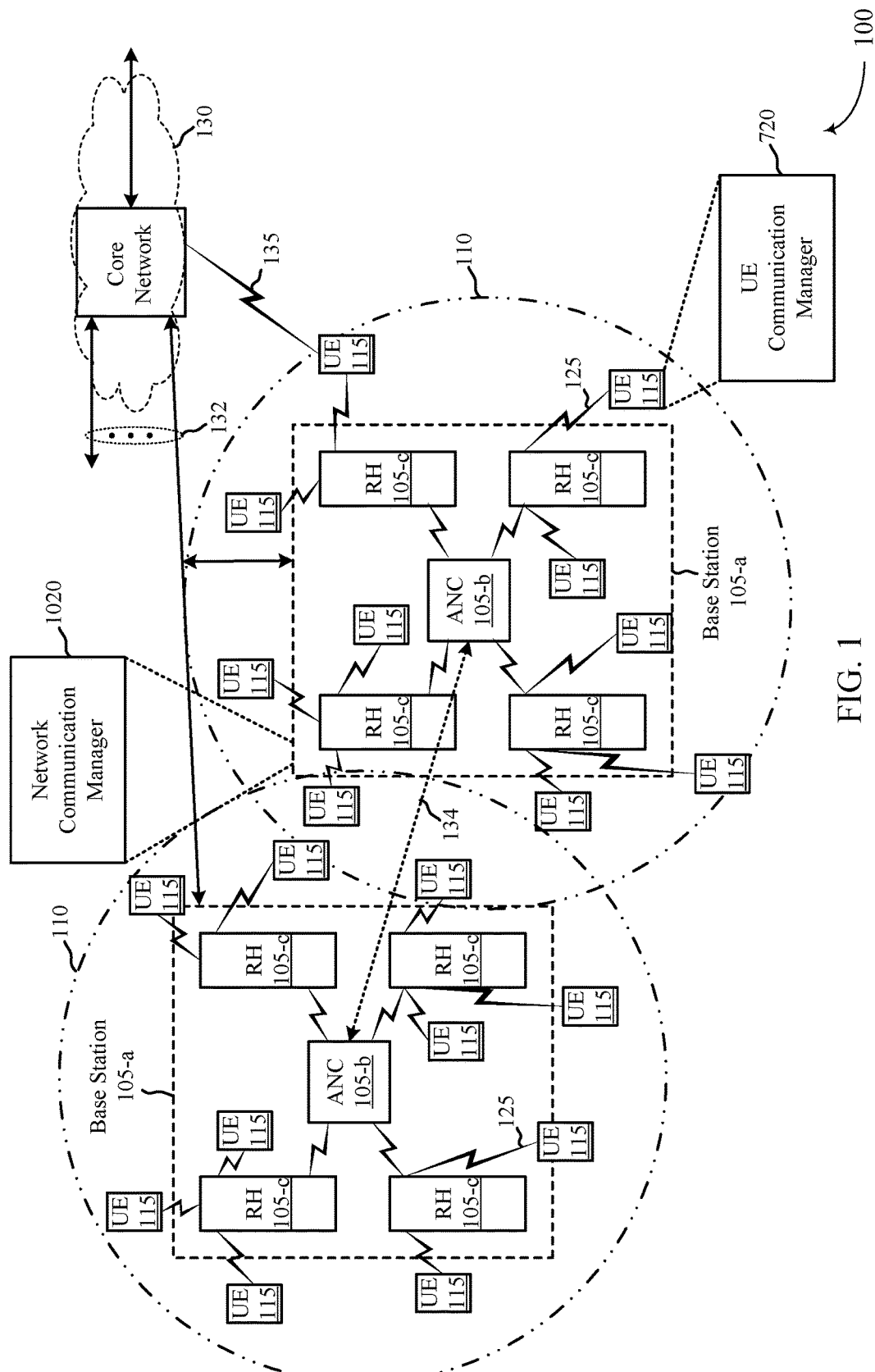
FIG. 1 illustrates an example of a system for wireless communication that supports waveform selection in wireless communications, in accordance with one or more aspects of the present disclosure.

Techniques are described that provide for waveform selection for UL and/or DL wireless transmissions based on one or more factors associated with the wireless transmission, a transmitter that is to transmit the wireless transmission, or combinations thereof. UL and DL transmissions may use one of a number of different waveforms, such as single-carrier waveforms (e.g., single-carrier frequency division multiplexing (SC-FDM) waveforms, DFT spread OFDM (DFT-s-OFDM) waveforms, or CDMA waveforms) that use a single carrier for information transmission of a wireless channel, and multi-carrier waveforms (e.g., OFDM waveforms) that use multiple carriers at different frequencies to transmit some of the bits on each channel. When referring to a single-carrier waveform, such a waveform may be any non-IFFT-based single carrier waveform.

According to various aspects of the disclosure, multi-carrier transmission waveforms or single-carrier waveforms may be selected for wireless transmissions based on a bandwidth allocated for the transmissions, a capability of a transmitter that is to transmit the transmissions, or combinations thereof. In some examples, a UE may provide an indication of the UE RF capability. Such a capability indication may include, for example, an indication of a bandwidth over which the UE can transmit at relatively high efficiency. A base station may receive such an RF capability indication, determine wireless resources associated with a wireless transmission, and select a multi-carrier waveform or a single-carrier waveform for the wireless transmission. The base station may provide an indication of the selected waveform to the UE for use in transmitting or receiving the wireless transmission. In some cases, a multi-carrier waveform may be selected when it is determined that the UE is not capable of transmitting over an entire allocated bandwidth with a single RF chain and would otherwise use CA to synthesize a single-carrier transmission over the entire allocated bandwidth. In some cases, a multi-carrier waveform may be selected based on the allocated bandwidth being above a threshold value, and a single-carrier waveform may be selected based on the allocated bandwidth being at or below the threshold value.

The present disclosure describes various techniques with reference to next generation networks (e.g., 5G or NR networks) that are being designed to support features such as high bandwidth operations, more dynamic subframe types, and self-contained subframe types (in which hybrid automatic repeat request (HARD) feedback for a subframe may be transmitted before the end of the subframe). However, such techniques may be used for any system in which multi-carrier or single-carrier waveforms may be used for UL or DL transmissions.

Aspects of the disclosure are initially described in the context of a wireless communications system. Aspects of the disclosure are further illustrated by and described with reference to diagrams, system diagrams, and flowcharts that relate to query-based UE capability determination for coordination across multiple radio access technologies.

FIG. 1 illustrates an example of a wireless communication system 100, in accordance with various aspects of the disclosure. The wireless communication system 100 may include network devices 105 (e.g., gNodeBs (gNBs), and/or RHs), UEs 115, and a core network 130. Wireless communication system 100 may support waveform selection for UL or DL transmissions. For example, wireless communication system 100 may support a capability report by a UE 115, and selection of a multi-carrier or single-carrier waveform for a subsequent wireless transmission based at least in part on the capability reported by the UE 115 (e.g., whether the UE 115 is to use CA to use an allocated bandwidth for transmission), a bandwidth allocated for a wireless transmission, or any combination thereof.

A core network 130 may provide user authentication, access authorization, tracking, Internet Protocol (IP) connectivity, and other access, routing, or mobility functions. At least some of the network devices 105 (e.g., network device 105-*a*, which may be an example of a LTE eNB, an eLTE eNB, an NR gNB, an NR Node-B, an NR access node or a base station, network device 105-*b*, which may be an example of a gNB, an ANC, or a centralized unit) may interface with the core network 130 through backhaul links 132 (e.g., S1, S2, NG-1, NG-2, NG-3, NG-C, NG-U etc.) and may perform radio configuration and scheduling for communication with the UEs 115. In various examples, the network devices 105-*b* may communicate, either directly or indirectly (e.g., through core network 130), with each other over backhaul links 134 (e.g., X1, X2, Xn etc.), which may be wired or wireless communication links. A UE 115 may communicate with the core network 130 through communication link 135.

Each network device 105-*b* may also communicate with a number of UEs 115 through a number of other network devices 105-c, where network device 105-c may be an example of a transmission reception point (TRP), a distributed unit (DU), a radio head (RH), a remote radio head (RRH), or a smart RH. In alternative configurations, various functions of each network device 105 may be distributed across various network devices 105 (e.g., RHs/distributed units and access network controllers/centralized units) or consolidated into a single network device 105 (e.g., a base station/an access node).

The wireless communication system 100 may support synchronous or asynchronous operation. For synchronous operation, the network devices 105-a and/or network devices 105-c may have similar frame timing, and transmissions from different network devices 105-a and/or network devices 105-c may be approximately aligned in time. For asynchronous operation, the network devices 105-a and/or network devices 105-c may have different frame timings, and transmissions from different network devices 105-a and/or network devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or one of the layer 2 protocol stack (e.g. Packet Data Convergence Protocol (PDCP)) may be IP-based. One of the layer 2 protocol stack (e.g. PDCP, Radio Link Control (RLC) or Medium Access Control (MAC)) may in some cases perform packet segmentation and reassembly to communicate over logical channels. One of the layer 2 protocol stack (e.g. A Medium Access Control (MAC)) may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, a smart phone, a smart watch, a customer premises equipment (CPE) or the like. A UE may be able to communicate with various types of network devices 105-a, network devices 105-c, base stations, access points, or other network devices, including macro eNBs, small cell eNBs, relay base stations, and the like. A UE may also be able to communicate directly with other UEs (e.g., using a peer-to-peer (P2P) protocol).

The communication link 125 and 135 shown in wireless communication system 100 may include UL channels from a UE 115 to a network device 105, and/or DL channels, from a network device 105 to a UE 115. The DL channels may also be called forward link channels, while the UL channels may also be called reverse link channels. Control information and data may be multiplexed on an UL channel or DL according to various techniques. Control information and data may be multiplexed on a DL channel, for example, using time-division-multiplexing (TDM) techniques, frequency-division-multiplexing (FDM) techniques, or hybrid TDM-FDM techniques. In some examples, the control information transmitted during a transmission time interval (TTI) of a DL channel may be distributed between different control regions in a cascaded manner (e.g., between a common control region and one or more UE-specific control regions).

Wireless communication system 100 may support operation on multiple cells or carriers, a feature which may be referred to as CA or multi-carrier operation. A carrier may also be referred to as a CC, a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both frequency-division-duplexing (FDD) and time-division-duplexing (TDD) CCs. Wireless communication system 100 may also support multiple-input multiple-output (MIMO) operation in which multiple concurrent transmissions may share time and frequency resources, and may uniquely modulate a transmission stream with space-time orthogonal codes, such as spatial frequency block codes (SFBC). These spatial resources may be called transmission layers, and the same or different streams of data may be transmitted over different transmission layers. For single-user MIMO (SU-MIMO), multiple transmission layers may be transmitted to the same UE, while in multiple user (MU-MIMO), multiple transmission layers may be transmitted to different UEs. A capability reported by a UE 115 may take into account the RF chains available at the UE 115 based on such multi-carrier or MIMO operation.

In some cases, wireless communication system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

Wireless communication system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmWave) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

As indicated above, UL and DL transmissions may use one of a number of different waveforms, such as single-carrier waveforms (e.g., SC-FDM waveforms, DFT-s-OFDM waveforms, or CDMA waveforms) that use a single carrier for information transmission of a wireless channel, and multi-carrier waveforms (e.g., OFDM waveforms) that use multiple carriers at different frequencies to transmit some of the bits on each channel. In some examples, the UL waveform for use by a UE 115 may be selected based on one or more factors, such as power amplifier (PA) efficiency, battery life, demodulation performance, and the like. Single-carrier waveforms (e.g., DFT-s-OFDM) may provide a lower peak-to-average power ratio (PAPR) than a multicarrier waveform, which may provide good PA efficiency at a UE 115 and thereby enable relatively good cell coverage with efficient power utilization that may be beneficial for a battery-powered UE 115.

Such single-carrier waveforms, however, may have relatively poor demodulation performance compared to a multi-carrier waveform (e.g., OFDM), depending on the MCS used for the transmission. For example, at relatively high modulation orders (e.g., 64 QAM) demodulation performance may be negatively impacted relative to a multi-carrier UL waveform, and thus a multi-carrier waveform may be more efficient in such cases. Additionally, in cases where a UE 115 has relatively good channel conditions, such a higher modulation order may be supportable for an UL transmission, and thus using such a MCS may enhance network efficiency. Accordingly, in such cases, a multi-carrier waveform may be desirable even though such a waveform may have a higher PAPR, less PA efficiency, and smaller cell coverage. Various examples provided herein provide that a multi-carrier or single-carrier waveform may be selected based on one or more factors to increase overall network efficiency and provide efficient use of UE 115 power.

In the example of FIG. 1, base station 105-a may include a network communications manager 101, which may receive an indication of UE 115 RF capability, determine wireless resources associated with a wireless transmission, and select a multi-carrier waveform or a single-carrier waveform for the wireless transmission. The base station 105-a may provide an indication of the selected waveform to the UE 115 for use in transmitting or receiving the wireless transmission. In some cases, a multi-carrier waveform may be selected when it is determined that the UE 115 is not capable of transmitting over an entire allocated bandwidth with a single RF chain and would otherwise use CA to synthesize a single-carrier transmission over the entire allocated bandwidth. In some cases, a multi-carrier waveform may be selected based on the allocated bandwidth being above a threshold value, and a single-carrier waveform may be selected based on the allocated bandwidth being at or below the threshold value. The network communications manager 101 may be an example of a base station communications manager 815 as described below with reference to FIG. 8.

UEs 115 may include a UE communications manager 102, which may provide a RF capability indication to a base station 105-a, receive an indication of whether an UL transmission to the base station 105-a is to be transmitted using a multi-carrier waveform or a single-carrier waveform, and transmit the UL transmission using the indicated multi-carrier waveform or single carrier waveform. In some cases, a UE 115 may identify that a multi-carrier waveform or a single-carrier waveform is to be used for a transmission based on a bandwidth for the wireless transmission. The UE communications manager 102 may be an example of a UE communications manager 1215 as described below with reference to FIG. 12.

Figure 2:
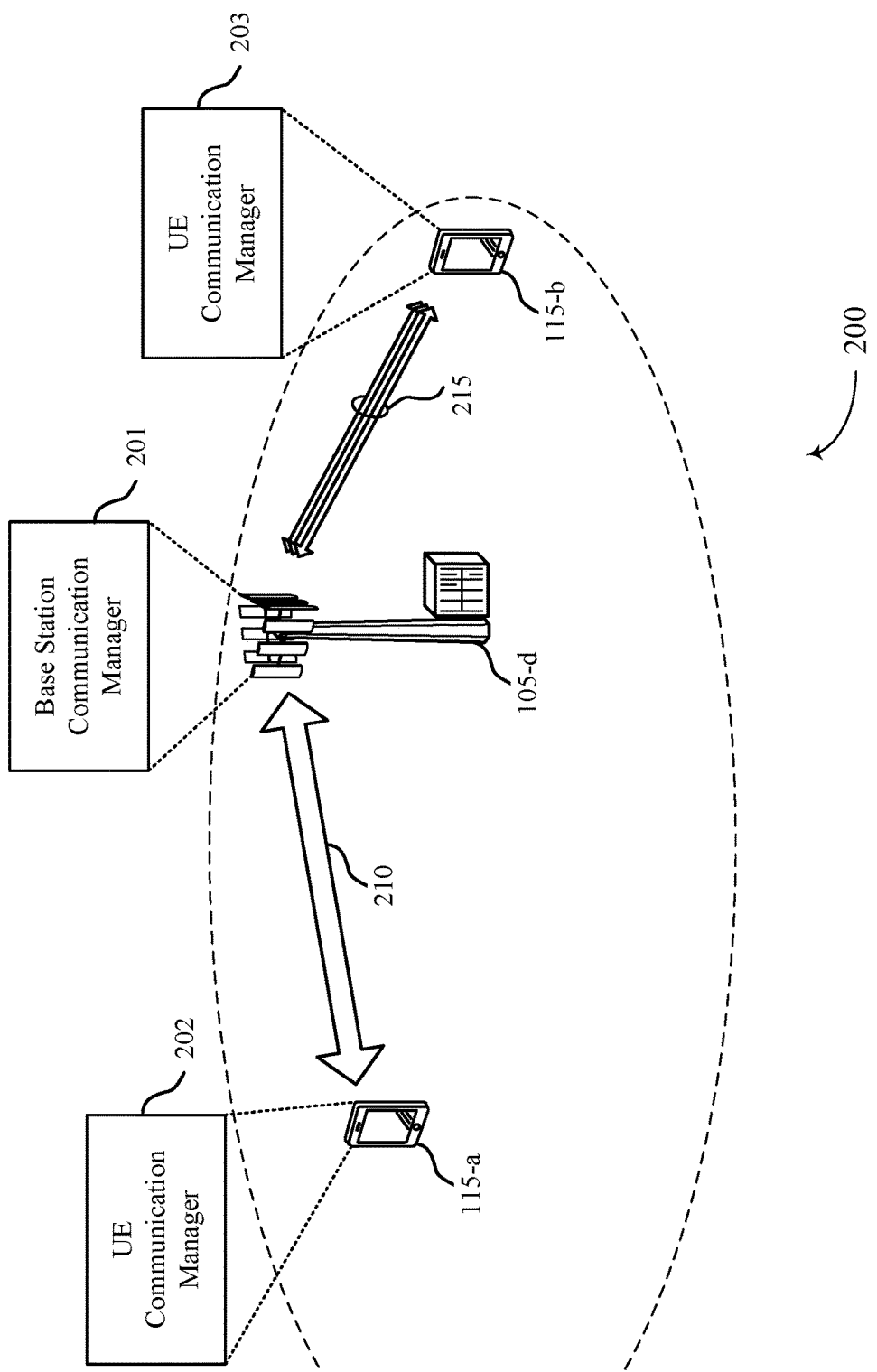
FIG. 2 illustrates an example of a portion of a wireless communication system that supports waveform selection in wireless communications, in accordance with one or more aspects of the present disclosure.

FIG. 2 illustrates an example of a portion of a wireless communication system 200 for waveform selection in wireless communications in accordance with various aspects of the present disclosure. Wireless communication system 200 may include a base station 105-d, a first UE 115-a, and a second UE 115-b, which may be examples of the corresponding devices described with reference to FIG. 1. In the example of FIG. 2, the base station 105-d may establish a first connection 210 with the first UE 115-a, which may be a wideband connection that covers a system bandwidth, and that an RF chain at the first UE 115-a is capable of supporting relatively efficiently. The base station 105-d may also establish a second connection 215 with the second UE 115-b, which may include a number of CCs that are used to occupy the system bandwidth. In the example of FIG. 2, the wireless communication system may operate according to a first radio access technology (RAT), such as a 5G or NR RAT, although techniques described herein may be applied to any RAT and to systems that may concurrently use two or more different RATs.

In some examples, the first base station 105-d may include a base station communications manager 201, which may be an example of network communications manager 101 of FIG. 1, and may be used to receive an indication of RF capability from the first UE 115-a, the second UE 115-b, or both. The base station communications manager 201 may determine wireless resources associated with the first connection 210 and the second connection 215, which may include, for example, bandwidth resources for each of the first connection 210 and the second connection 215. The base station 105-d may provide an indication of the selected waveform to the first UE 115-a for use in transmitting or receiving wireless transmissions over the first connection 210. In some cases, a single-carrier waveform may be selected for the first connection 210 when it is determined that the first UE 115-a is capable of transmitting over an entire allocated bandwidth with a single RF chain.

In some cases, the second UE 115-b may provide an indication to the base station 105-d of an RF capability that would not enable the second UE 115-b to transmit over the entire allocated bandwidth, and that a single-carrier waveform would have to be synthesized using CA over two or more CCs that form the second connection 215. In such a case, the base station 105-d may select a multi-carrier waveform for the second connection 215. In some examples, the base station communications manager 201 may select a single-carrier or multi-carrier waveform based on the allocated bandwidth being above or below a threshold value, either based on the allocated bandwidth alone or in combination with one or more other factors associated with the UE 115 or associated channel conditions. The base station communications manager 201 may be an example of a base station communications manager 815 as described below with reference to FIG. 8.

The UE 115-a may include a UE communications manager 202, and the UE 115-b may include a UE communications manager 203 which may be examples of UE communications manager 102 of FIG. 1, and each of which may be used to provide a RF capability indication to base station 105-d, receive in response to the RF capability indication, from the base station, an indication of a waveform or a bandwidth, or both for a wireless transmission between the UE and the base station, and identify a waveform for the wireless transmission based at least in part on the indication of the waveform or the bandwidth, or both. In some examples, UE communications manager 202 and UE communications manager 203 may determine that the bandwidth includes two or more component carriers, and identify a multi-carrier waveform based on the determination. Additionally or alternatively, UE communications manager 202 and UE communications manager 203 may identify a multi-carrier waveform based on the bandwidth exceeding a threshold or identify a multi-carrier waveform based at least in part on the bandwidth exceeding the RF capability.

UE communications manager 202 and UE communications manager 203 may also receive an indication of whether transmissions with the base station 105-d are to use a multi-carrier waveform or a single-carrier waveform, and transmit/receive the transmissions using the indicated multi-carrier waveform or single carrier waveform. In some cases, UE communications manager 202 or UE communications manager 203 may identify that a multi-carrier waveform or a single-carrier waveform is to be used for a transmission based on a bandwidth for the wireless transmission. The UE communications manager 202 and the UE communications manager 203 may be examples of a UE communications manager 1215 as described below with reference to FIG. 12.

As indicated above, in some examples the wireless communication system 200 may be a portion of a NR or 5G network. Based on growing demand for data and throughput anticipated for 5G, more RF spectrum may be necessary to support communications. In some cases, such a wireless communication system 200 may operate using relatively high frequency bands (e.g., mmWave) in order to have access to additional unpaired spectrum available at such frequency bands, which may be less expensive than paired spectrum at lower frequency bands such as 2 Ghz and below. Additionally, such relatively high frequency bands may potentially provide relatively large bandwidth for UL and DL channels, such as bandwidths of hundreds of MHz per channel. As indicated above, such high frequencies may have a relatively small coverage area, and may be supported when a UE 115 is relatively close to a base station 105-e, which may also indicate that a connection may support higher modulation orders, which may be more efficiently transmitted using multi-carrier waveforms to provide enhanced demodulation performance.

According to some examples, the selection of a multi-carrier waveform or a single-carrier waveform may be based on a number of different factors. For example, base station 105-d may consider the SNR associated with a UE 115. For example, the first UE 115-a may only achieve a low SNR, which may be typical of a cell edge user, and should be assigned single carrier waveform (e.g., a DFT-s-OFDM waveform), while the second UE 115-b may have a relatively high SNR and may use a multi-carrier waveform (e.g., an OFDM waveform). Additionally or alternatively, a TM indicated by a UE 115 may be considered, where an indication of a capability to transmit multiple streams (i.e., MIMO) may indicate that the UE 115 is not power limited, and may thus be assigned multi-carrier waveforms (e.g., OFDM), and an indication of a rank one transmission (i.e., single stream capability) may be assigned a single-carrier waveform (e.g., DFT-s-OFDM). A further alternative may be an MCS-related consideration in which, for example, second UE 115-b may indicate in channel quality information (CQI) provided to the base station 105-d that it can transmit with a relatively high modulation order MCS, and may be assigned to use a multi-carrier waveform. Likewise, if the first UE 115-a indicates a relatively low MCS in CQI, a single-carrier waveform may be assigned. Of course, any combination of the above-described factors may be used in making a determination of whether to use a multi-carrier or single-carrier waveform.

Figure 3:
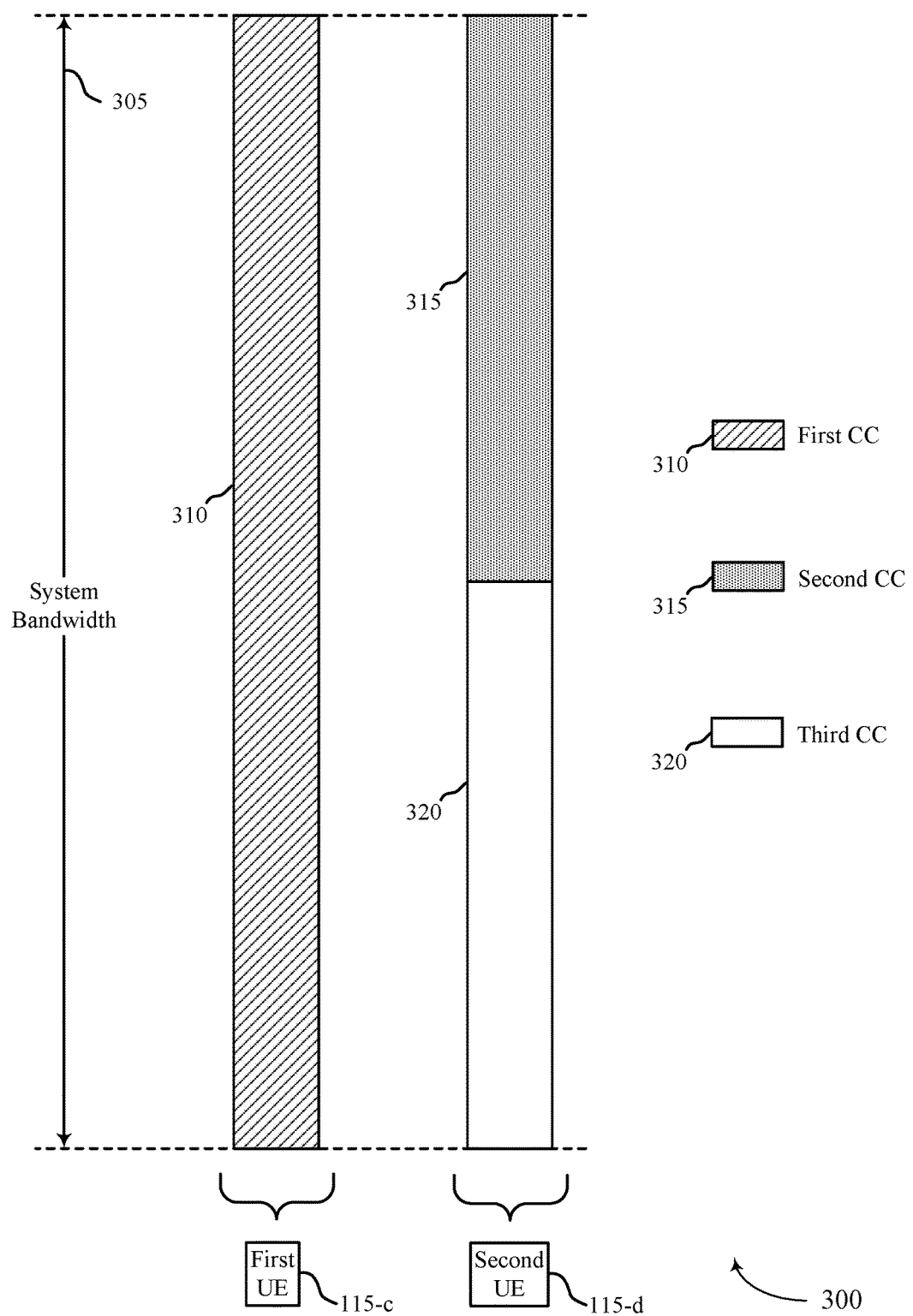
FIG. 3 illustrates an example of a system bandwidth and UE component carriers that support waveform selection in wireless communications, in accordance with one or more aspects of the present disclosure.

FIG. 3 illustrates an examples of a wireless communications bandwidth supported by different UEs in accordance with various aspects of the present disclosure. In the example of FIG. 3 a first UE 115-c and a second UE 115-d may use different techniques to provide a transmission that covers an entire system bandwidth 305. The first UE 115-c and second UE 115-d may be examples of the corresponding devices described with reference to FIGS. 1-2.

In the example of FIG. 3, the first UE 115-c may establish a first connection using a first component carrier (CC) 310 that spans the entire system bandwidth 305. The second UE 115-d may establish a second connection using a second CC 315 and a third CC 320, that may collectively span the system bandwidth 305. In some cases, the system bandwidth 305 may be a relatively wideband allocation (e.g., hundreds of MHz), and a single RF chain at the second UE 115-d may not be able to cover the whole bandwidth, and thus carrier aggregation may be needed from the second UE 115-d to cover the whole system bandwidth 305. Multiple carriers from carrier aggregation will, at least partially, result in at least a partial degradation of the various properties of a single-carrier waveform that were discussed above, even if each of the second CC 315 and the third CC 320 are single carrier waveforms (e.g., DFT-s-OFDM). Thus, in some examples, if a wideband single-carrier transmission is to be synthesized from multiple narrower-band transmissions, a multi-carrier waveform may be considered for the transmission. In such cases, a demodulation performance advantage may favor a multi-carrier waveform, as well as potential degradation of PAPR resulting from multiple CCs.

Additionally, when system bandwidth 305 becomes relatively large, the system bandwidth 305 may become more frequency selective, and some parts of the channel may have more fading relative to other parts of the channel, which may have a negative impact on demodulation performance. In such cases, the demodulation performance advantage of a multi-carrier waveform may favor such a multi-carrier waveform over a single-carrier waveform. Thus, another factor that may be considered in selecting a waveform for a transmission may include channel characteristics such as frequency selectivity of a channel.

Figure 4:
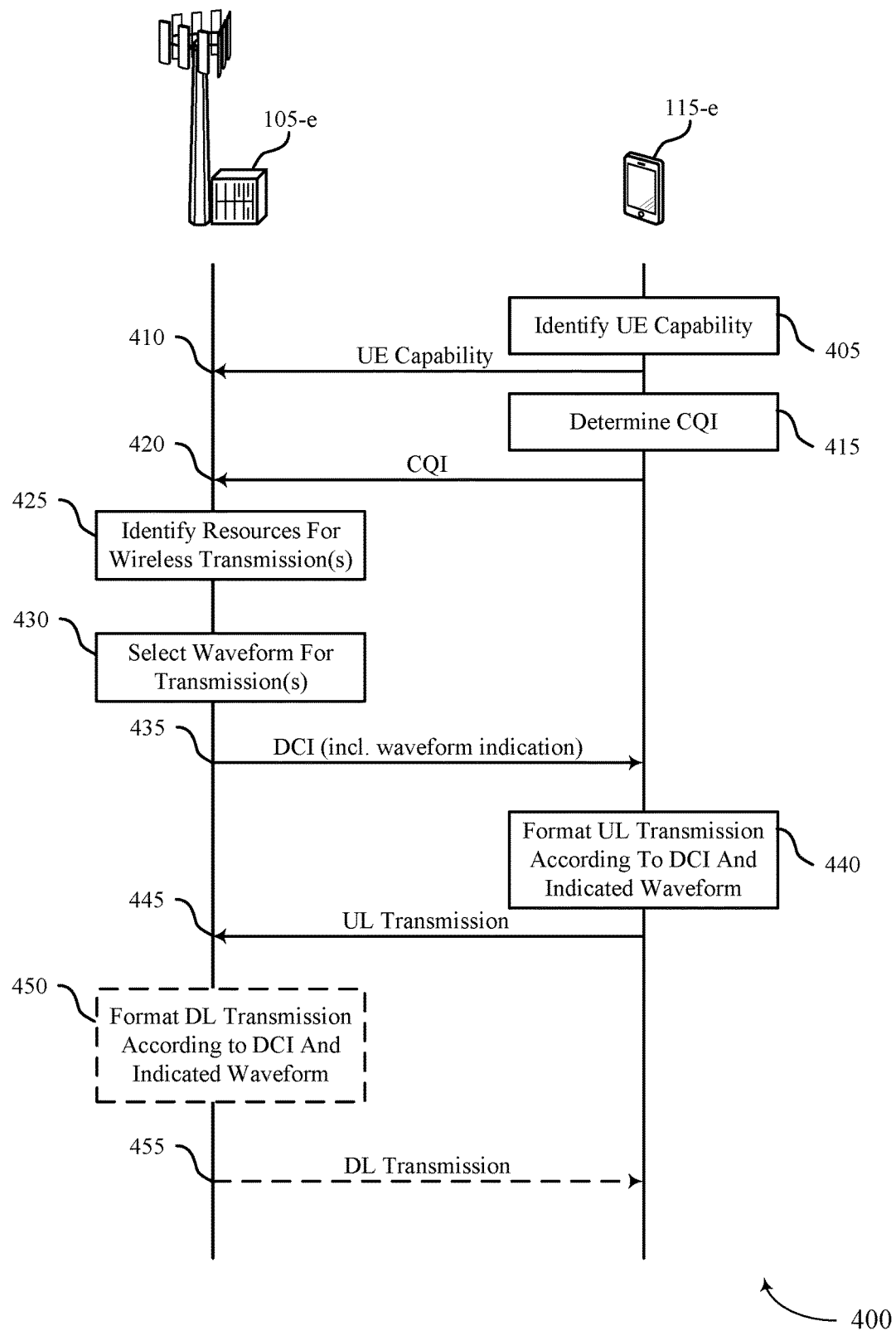
FIG. 4 illustrates an example of a process flow that supports waveform selection in wireless communications, in accordance with one or more aspects of the present disclosure.

FIG. 4 illustrates an example of a process flow 400 for waveform selection in wireless communications in accordance with various aspects of the present disclosure. Process flow 400 may include a base station 105-*e* and a UE 115-*e*, which may be examples of the corresponding devices described with reference to FIGS. 1-3. The UE 115-*e* may, at block 405, identify a UE capability of the UE 115-*e*. Such a UE capability may be, for example, an indication of a UE category that may be used to identify UE capability (e.g., a number of RF chains of the UE 115-*e*, a bandwidth capability of the UE 115-*e*, a multiple carrier capability of the UE 115-*e*, etc.). The UE capability 410 may be transmitted from the UE 115-*e* to the base station 105-*e*. In some cases, the UE capability 410 may be provided during the establishment of an RRC connection.

At block 415, the UE 115-*e* may determine CQI associated with a channel that may be used for communications. Such CQI may include, for example, CQI (e.g., SNR, MCS), a precoding matrix indicator (PMI), and a rank indicator (RI) for the UE. The UE 115-*e* may transmit the CQI 420 to the base station 105-*e*. At block 425, the base station 105-*e* may identify wireless resources for one or more wireless transmission(s). The identification of wireless resources may include determining UL or DL resources for the wireless transmission(s), and may include a determination of one or more channels and associated bandwidths for the transmission(s).

The base station 105-*e* may, at block 430, select a waveform to use for the wireless transmission(s). The selection of the waveform may include selection of a single-carrier or multi-carrier waveform based at least in part on one or more of the factors as discussed above. The base station 105-*e* may then transmit DL control information (DCI) to the UE 115-*e*, that may include information on the resources for the wireless transmission(s), and an indication of the waveform to use for the transmission(s).

The UE 115-*e* may receive the DCI and identify the transmission resources and the selected waveform for the transmission(s). At block 440, when the wireless transmission(s) include UL transmissions, the UE 115-*e* may format the UL transmission according to the DCI and indicated waveform. For example, the UE 115-*e* may format a single-carrier or a multi-carrier waveform for UL transmission 445 using the allocated resources from the DCI, and transmit the UL transmission 445 to the base station 105-*e*.

At optional block 450, the base station 105-*e* may format one or more DL transmissions according to the DCI and indicated waveform, and transmit the associated DL transmission 455 to the UE 115-*e*. The DL transmission 455 may be transmitted using a single-carrier waveform or a multi-carrier waveform, which may be selected based at least in part on one or more of the factors as discussed above.

Figure 5:
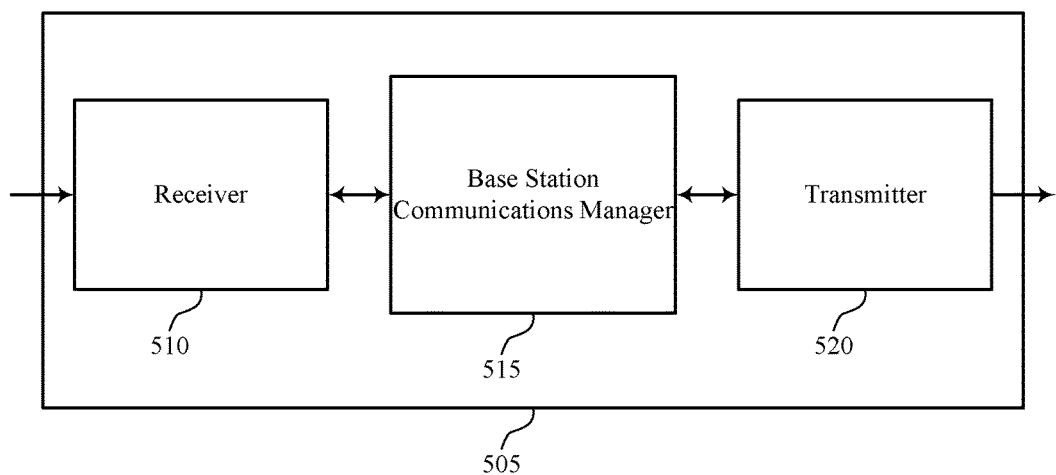
FIGS. 5 through 7 show block diagrams of a device that supports waveform selection in wireless communications, in accordance with one or more aspects of the present disclosure.

FIG. 5 shows a block diagram 500 of a device 505 that supports waveform selection in wireless communications in accordance with various aspects of the present disclosure. Device 505 may be an example of aspects of a base station 105 as described with reference to FIGS. 1-4. Device 505 may include receiver 510, base station communications manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to waveform selection in wireless communications, etc.). Information may be passed on to other components of the device. The receiver 510 may be an example of aspects of the transceiver 835 described with reference to FIG. 8.

Receiver 510 may receive the wireless transmission from the UE using the selected waveform. Base station communications manager 515 may be an example of aspects of the network communications manager 101, base station communications manager 201, or base station communications manager 815 described with reference to FIGS. 1, 2, and 8.

Base station communications manager 515 may receive a RF capability indication from a UE, select a multi-carrier waveform or a single-carrier waveform for a wireless transmission between the UE and the base station, and transmit an indication of the selected waveform to the UE. The base station communications manager 515 may, in some cases, identify a bandwidth for a wireless transmission between a UE and the base station, select a multi-carrier waveform or a single-carrier waveform for the wireless transmission based on the identified bandwidth for the wireless transmission, and transmit an indication of the selected waveform to the UE.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas. Transmitter 520 may transmit wireless transmissions to a UE using the selected single-carrier or multi-carrier waveform.

Figure 6:
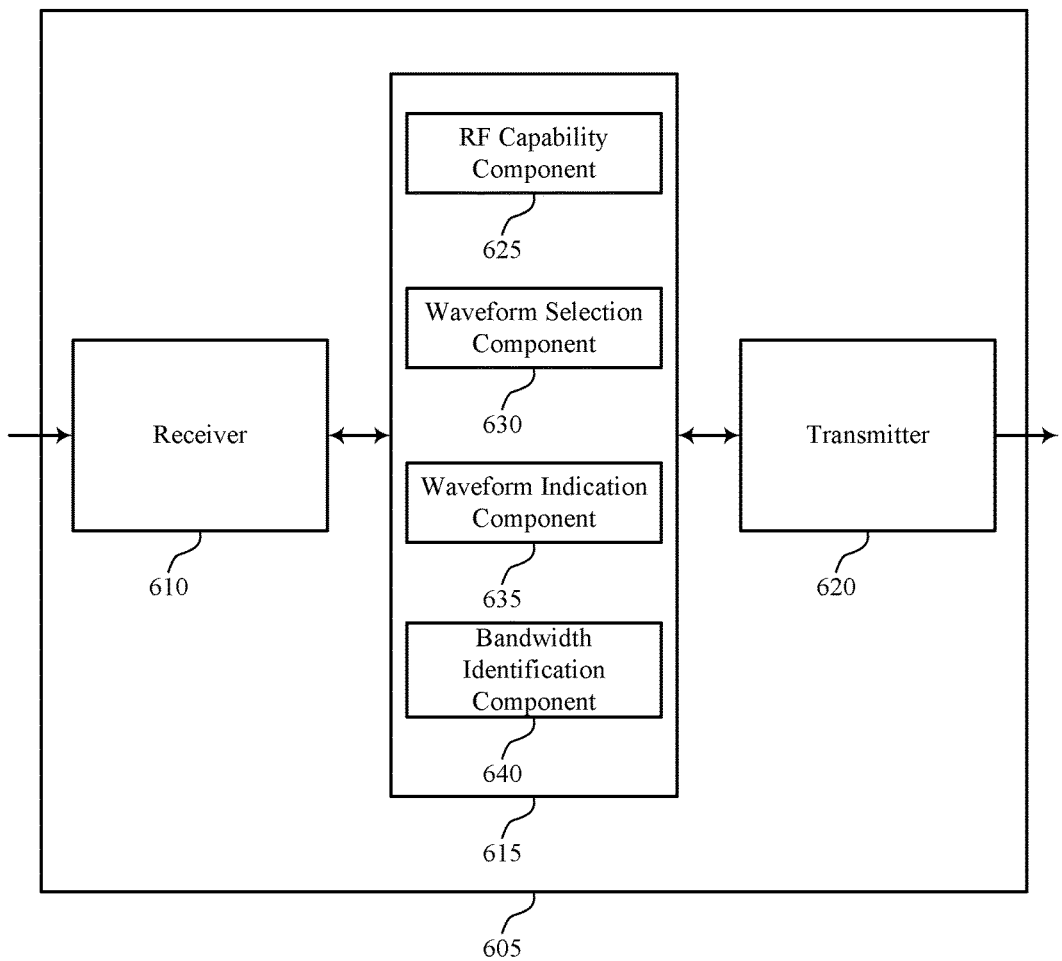

FIG. 6 shows a block diagram 600 of a device 605 that supports waveform selection in wireless communications in accordance with various aspects of the present disclosure. Device 605 may be an example of aspects of a device 505 or a base station 105 as described with reference to FIGS. 1-5. Device 605 may include receiver 610, base station communications manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to waveform selection in wireless communications, etc.). Information may be passed on to other components of the device. The receiver 610 may be an example of aspects of the transceiver 835 described with reference to FIG. 8.

Base station communications manager 615 may be an example of aspects of the network communications manager 101, base station communications manager 201, or the base station communications manager 815 described with reference to FIGS. 1, 2, and 8. Base station communications manager 615 may also include RF capability component 625, waveform selection component 630, waveform indication component 635, and bandwidth identification component 640.

RF capability component 625 may receive a RF capability indication from a UE, and the selecting the multi-carrier waveform or single-carrier waveform may be based on the RF capability indication. In some cases, the RF capability indication indicates a single-carrier bandwidth capability of the UE.

Waveform selection component 630 may select a multi-carrier waveform or a single-carrier waveform for a wireless transmission between the UE and the base station. In some cases, waveform selection component 630 may select the multi-carrier waveform when the bandwidth for the wireless transmission exceeds a threshold value, select the multi-carrier waveform based on the SNR, TM, MCS, or any combination thereof, select the multi-carrier waveform responsive to determining a UE capability, select a multi-carrier waveform or a single-carrier waveform for the wireless transmission based on an identified bandwidth for the wireless transmission, or any combination thereof. In some cases, the multi-carrier waveform includes an OFDM waveform. In some cases, the RF capability indication indicates that the UE is to use carrier aggregation for transmission of the wireless transmission, and the multi-carrier waveform is selected based on the indication of carrier aggregation. In some cases, the single-carrier waveform includes a DFT-s-OFDM waveform. In some cases, the RF capability indication indicates that the UE is to use carrier aggregation for transmission of the wireless transmission, and where the multi-carrier waveform is selected based on the indication of carrier aggregation. In some cases, the single-carrier waveform includes a DFT-s OFDM waveform. In some cases, the multi-carrier waveform includes an OFDM waveform. Waveform indication component 635 may transmit an indication of the selected waveform to the UE (e.g., in DCI transmitted to the UE).

Bandwidth identification component 640 may identify a bandwidth for the wireless transmission, and determine that the bandwidth for the wireless transmission exceeds a single-carrier bandwidth capability of the UE. In some cases, the RF capability indication indicates a single-carrier bandwidth capability of the UE, and it may be determined that the bandwidth for the wireless transmission exceeds the single-carrier bandwidth capability of the UE.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
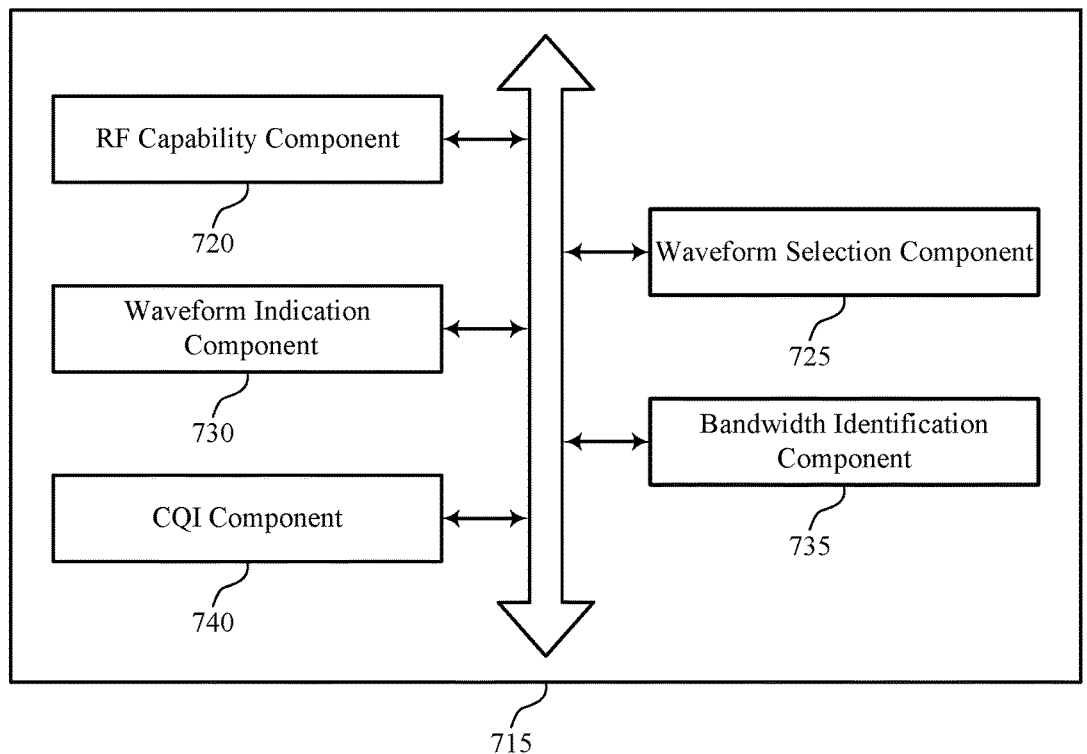

FIG. 7 shows a block diagram 700 of a base station communications manager 715 that supports waveform selection in wireless communications in accordance with various aspects of the present disclosure. The base station communications manager 715 may be an example of aspects of a network communications manager 101, a base station communications manager 201, a base station communications manager 515, a base station communications manager 615, or a base station communications manager 815 described with reference to FIGS. 1, 2, 5, 6, and 8. The base station communications manager 715 may include RF capability component 720, waveform selection component 725, waveform indication component 730, bandwidth identification component 735, and CQI component 740. Each of these modules may communicate, directly or indirectly, with one another (e.g., via one or more buses).

RF capability component 720 may receive a RF capability indication from a UE and receive a RF capability indication from the UE. In some cases, the selecting the multi-carrier waveform or a single-carrier waveform is based on the RF capability indication. In some cases, the RF capability indication indicates a single-carrier bandwidth capability of the UE.

Waveform selection component 725 may select a multi-carrier waveform or a single-carrier waveform for a wireless transmission between the UE and the base station. In some cases, the waveform selection component 725 may select the multi-carrier waveform when the bandwidth for the wireless transmission exceeds a threshold value, select the multi-carrier waveform based on the SNR, TM, MCS, or any combination thereof, of a UE, select the multi-carrier waveform responsive to the determining UE bandwidth capability, select a multi-carrier waveform for the wireless transmission based on the identified bandwidth for the wireless transmission, or any combination thereof. In some cases, the multi-carrier waveform includes an OFDM waveform.

In some cases, the RF capability indication indicates that the UE is to use carrier aggregation for transmission of the wireless transmission, and the multi-carrier waveform may be selected based on the indication of carrier aggregation. In some cases, the single-carrier waveform includes a DFT-s-OFDM waveform. In some cases, the multi-carrier waveform includes an OFDM waveform.

Waveform indication component 730 may transmit an indication of the selected waveform to the UE. Bandwidth identification component 735 may identify a bandwidth for the wireless transmission, and may determine that the bandwidth for the wireless transmission exceeds the single-carrier bandwidth capability of the UE. CQI component 740 may identify one or more of a SNR for the UE, a TM of the wireless transmission, a MCS of the wireless transmission, a RI, a PMI, or any combination thereof.

Figure 8:
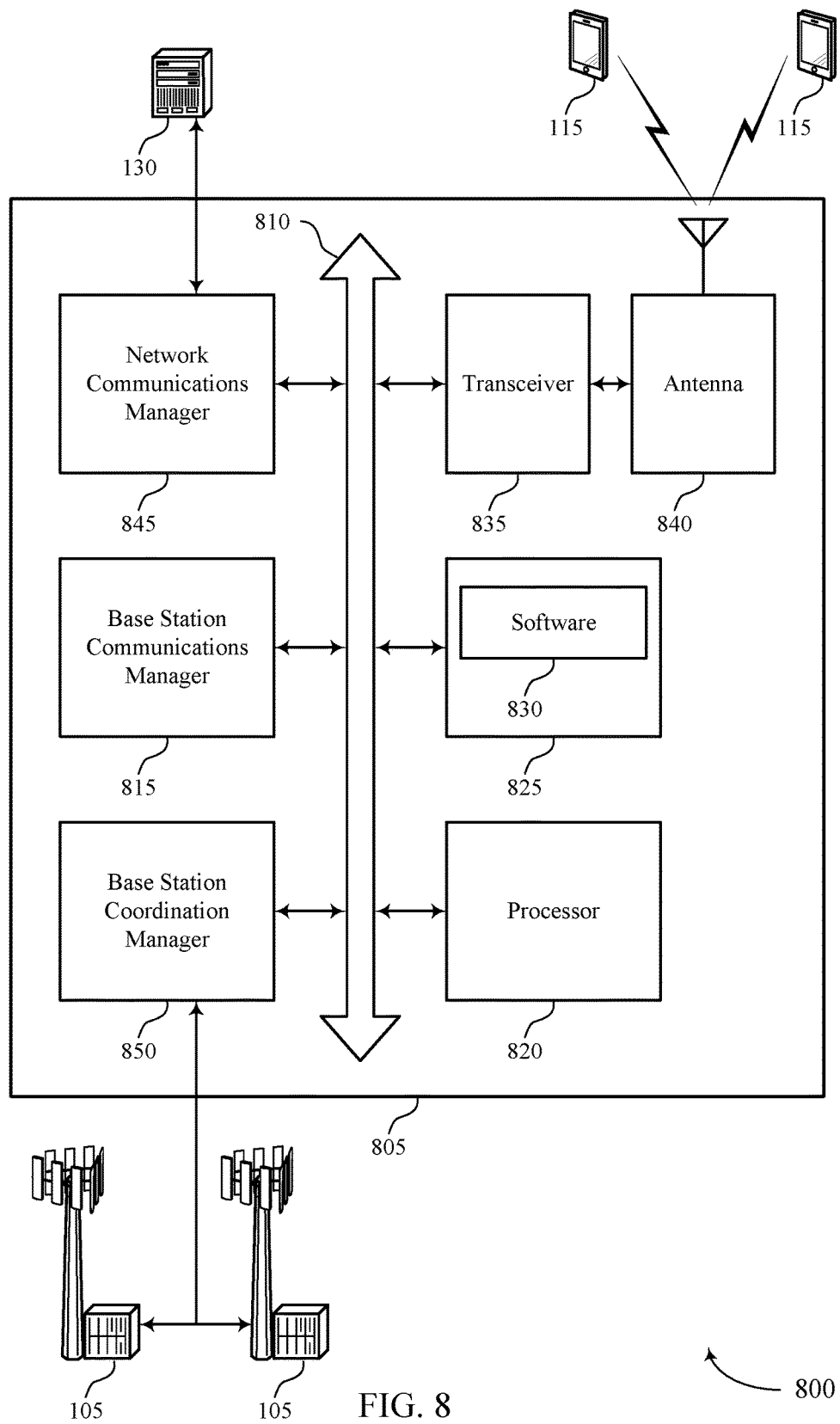
FIG. 8 illustrates a block diagram of a system including a base station that supports waveform selection in wireless communications, in accordance with one or more aspects of the present disclosure.

FIG. 8 shows a diagram of a system 800 including a device 805 that supports waveform selection in wireless communications in accordance with various aspects of the present disclosure. Device 805 may be an example of or include the components of device 505, device 605, or a base station 105 as described above, e.g., with reference to FIGS. 1, 5 and 6. Device 805 may include components for bi-directional voice and data communications including components for transmitting and receiving communications, including base station communications manager 815, processor 820, memory 825, software 830, transceiver 835, antenna 840, network communications manager 845, and base station coordination manager 850. These components may be in electronic communication via one or more busses (e.g., bus 810). Base station communications manager 815 may be an example of aspects of a network communications manager 101, a base station communications manager 201, a base station communications manager 515, a base station communications manager 615, or a base station communications manager 715 described with reference to FIGS. 1, 2, 5, 6, and 7. Device 805 may communicate wirelessly with one or more UEs 115.

Base station coordination manager 850 may manage communications with other base station 105, and may include a controller or scheduler for controlling communications with UEs 115 in cooperation with other base stations 105. For example, the base station coordination manager 850 may coordinate scheduling for transmissions to UEs 115 for various interference mitigation techniques such as beamforming or joint transmission. In some examples, base station coordination manager 850 may provide an interface within a wireless communication network technology to provide communication between base stations 105.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820.

Processor 820 may be configured to execute computer-readable instructions stored in a memory to perform various functions (e.g., functions or tasks supporting waveform selection in wireless communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support waveform selection in wireless communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Figure 9:
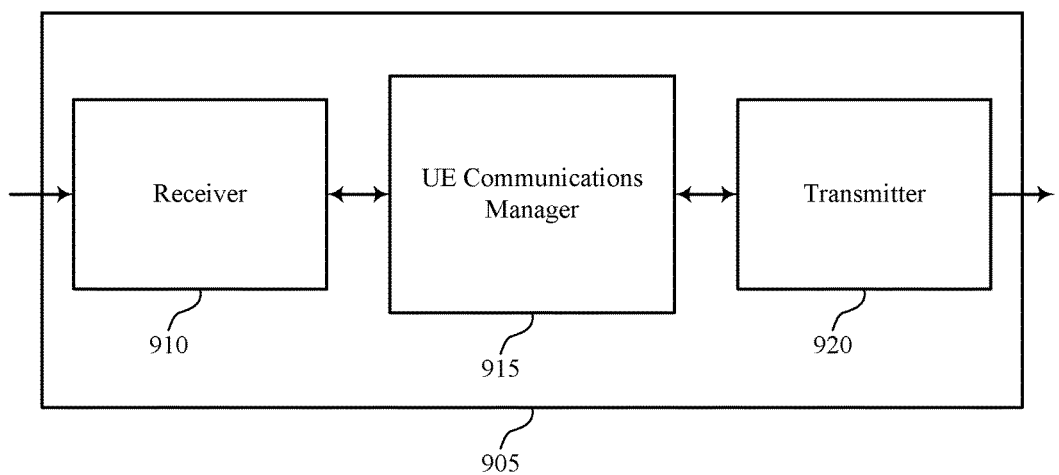
FIGS. 9 through 11 show block diagrams of a device that supports waveform selection in wireless communications, in accordance with one or more aspects of the present disclosure.

FIG. 9 shows a block diagram 900 of a device 905 that supports waveform selection in wireless communications in accordance with various aspects of the present disclosure. Device 905 may be an example of aspects of a UE 115 as described with reference to FIG. 1. Device 905 may include receiver 910, UE communications manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to waveform selection in wireless communications, etc.). Information may be passed on to other components of the device. The receiver 910 may be an example of aspects of the transceiver 1235 described with reference to FIG. 12. Receiver 910 may receive wireless transmissions from a base station using a single-carrier or multi-carrier waveform.

UE communications manager 915 may be an example of aspects of the UE communications manager 102, UE communications manager 202, UE communications manager 203, or UE communications manager 1215 described with reference to FIGS. 1, 2, and 12.

UE communications manager 915 may transmit a RF capability indication to a base station and receive an indication of whether an UL transmission to the base station is to be transmitted using a multi-carrier waveform or a single-carrier waveform. The UE communications manager 915 may also receive, from a base station, an indication of a bandwidth for a wireless transmission between the UE and the base station and identify a multi-carrier waveform or a single-carrier waveform for the wireless transmission based on the indication of the bandwidth for the wireless transmission.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas. Transmitter 920 may transmit UL transmissions using the indicated multi-carrier waveform or single carrier waveform, and in some cases, may transmit an identified SNR, TM, or MCS to the base station.

Figure 10:
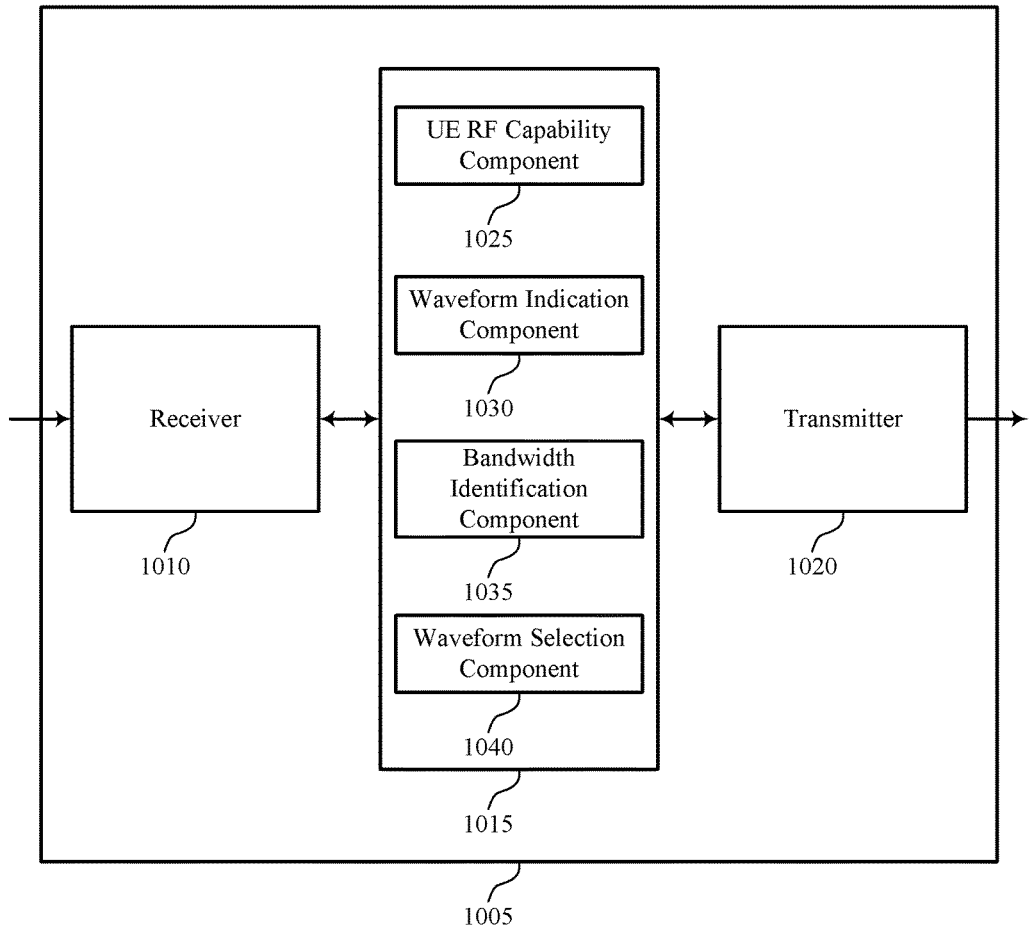

FIG. 10 shows a block diagram 1000 of a device 1005 that supports waveform selection in wireless communications in accordance with various aspects of the present disclosure. Device 1005 may be an example of aspects of a device 905 or a UE 115 as described with reference to FIGS. 1 and 9. Device 1005 may include receiver 1010, UE communications manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to waveform selection in wireless communications, etc.). Information may be passed on to other components of the device. The receiver 1010 may be an example of aspects of the transceiver 1235 described with reference to FIG. 12.

UE communications manager 1015 may be an example of aspects of the UE communications manager 102, UE communications manager 202, UE communications manager 203, the UE communications manager 915, or the UE communications manager 1215 described with reference to FIGS. 1, 2, 9, and 12.

UE communications manager 1015 may also include UE RF capability component 1025, waveform indication component 1030, bandwidth identification component 1035, and waveform selection component 1040.

UE RF capability component 1025 may transmit a RF capability indication to a base station, and the identifying the multi-carrier waveform or a single-carrier waveform may be based on the RF capability indication. In some cases, the RF capability indication indicates a single-carrier bandwidth capability of the UE. In some cases, the RF capability indication indicates that the UE is to use carrier aggregation for transmission of an UL transmission.

Waveform indication component 1030 may receive an indication of whether an UL transmission to the base station is to be transmitted using a multi-carrier waveform or a single-carrier waveform. Bandwidth identification component 1035 may receive, from a base station, an indication of a bandwidth for a wireless transmission between the UE and the base station.

Waveform selection component 1040 may identify a multi-carrier waveform or a single-carrier waveform for the wireless transmission based on the indication of the bandwidth for the wireless transmission. In some cases, the single-carrier waveform includes a DFT-s-OFDM waveform. In some cases, the multi-carrier waveform includes an OFDM waveform.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
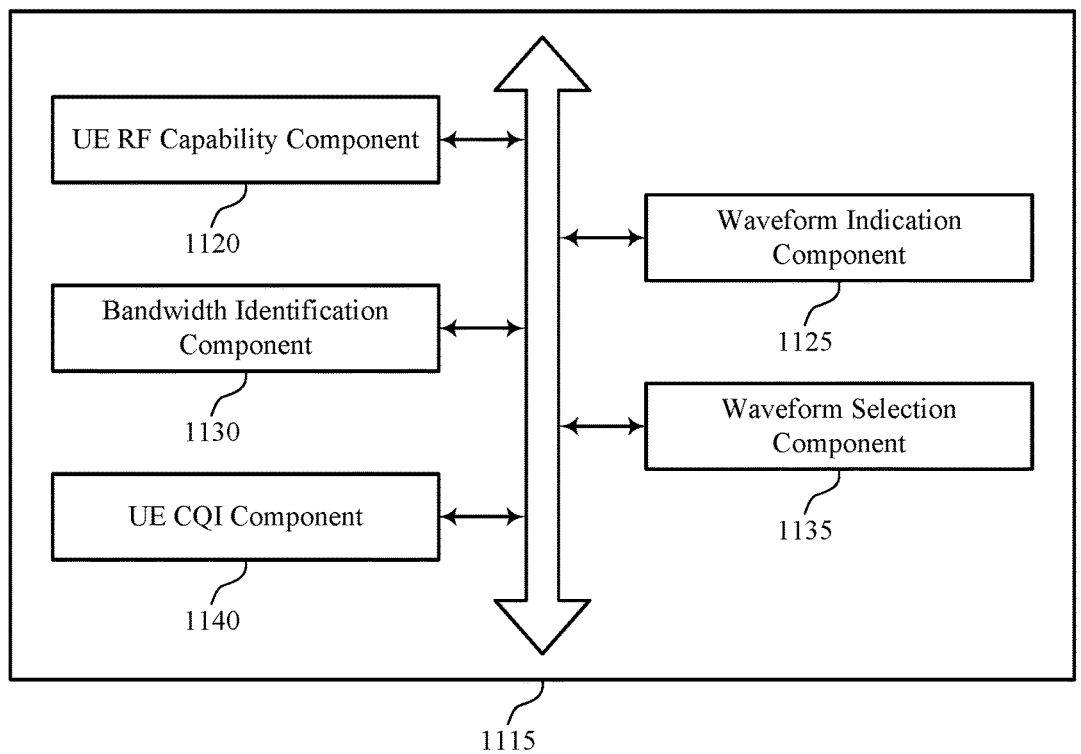

FIG. 11 shows a block diagram 1100 of a UE communications manager 1115 that supports waveform selection in wireless communications in accordance with various aspects of the present disclosure. The UE communications manager 1115 may be an example of aspects of a UE communications manager described with reference to FIGS. 1, 2, 9, 10, and 12. The UE communications manager 1115 may include UE RF capability component 1120, waveform indication component 1125, bandwidth identification component 1130, waveform selection component 1135, and UE CQI component 1140. Each of these modules may communicate, directly or indirectly, with one another (e.g., via one or more buses).

UE RF capability component 1120 may transmit a RF capability indication to a base station, and the identifying the multi-carrier waveform or a single-carrier waveform may be based on the RF capability indication. In some cases, the RF capability indication indicates a single-carrier bandwidth capability of the UE. In some cases, the RF capability indication indicates that the UE is to use carrier aggregation for transmission of the UL transmission.

Waveform indication component 1125 may receive an indication of whether an UL transmission to the base station is to be transmitted using a multi-carrier waveform or a single-carrier waveform. Bandwidth identification component 1130 may receive, from a base station, an indication of a bandwidth for a wireless transmission between the UE and the base station.

Waveform selection component 1135 may identify a multi-carrier waveform or a single-carrier waveform for the wireless transmission based on the indication of the bandwidth for the wireless transmission. UE CQI component 1140 may identify one or more of a SNR for the UE, a TM of the UL transmission, or a MCS of the UL transmission.

Figure 12:
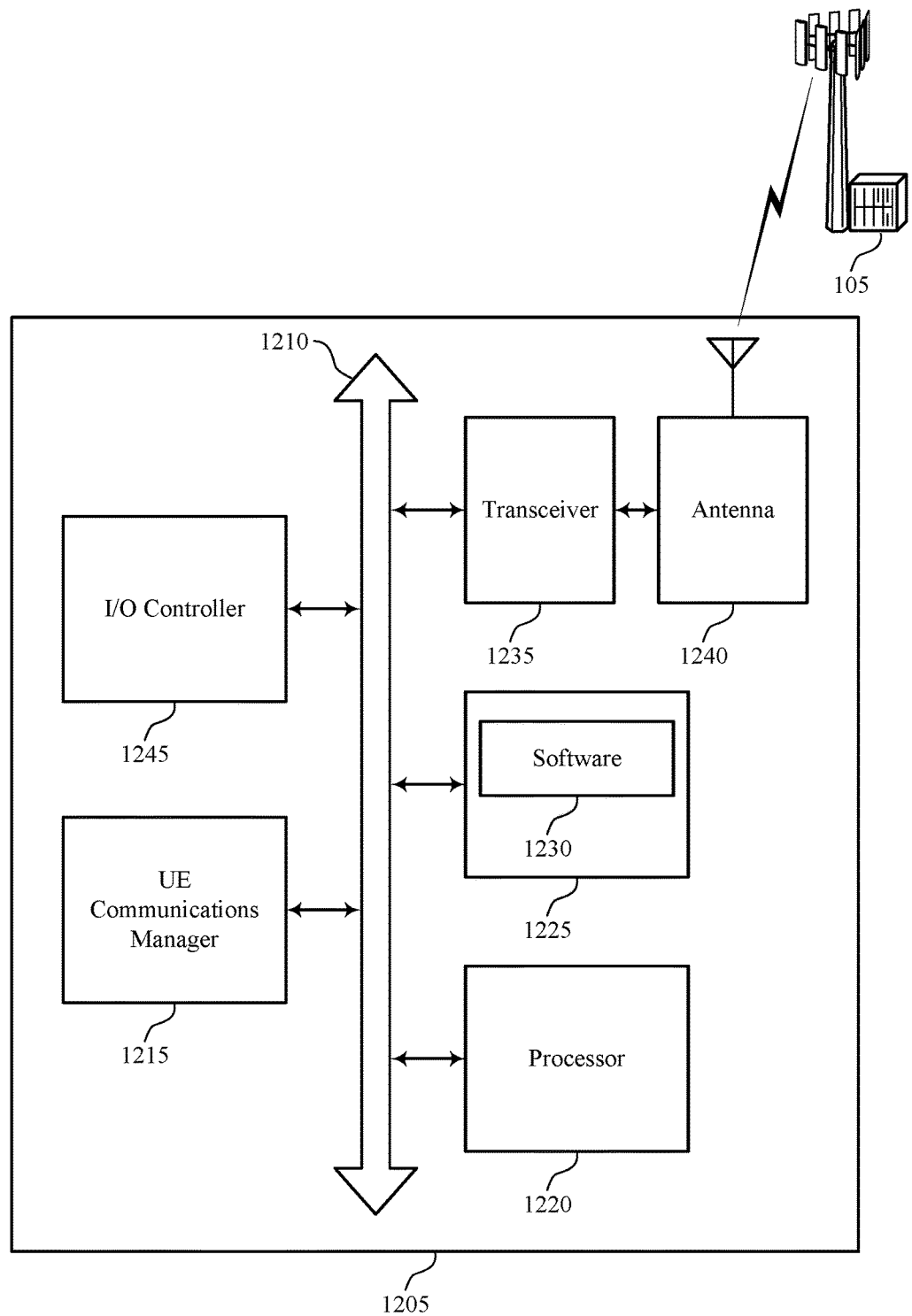
FIG. 12 illustrates a block diagram of a system including a UE that supports waveform selection in wireless communications, in accordance with one or more aspects of the present disclosure.

FIG. 12 shows a diagram of a system 1200 including a device 1205 that supports waveform selection in wireless communications in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105. UE communications manager 1215 may be an example of aspects of the UE communications manager discussed with respect to FIG. 1, 2, 9, 10, or 11.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting waveform selection in wireless communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support waveform selection in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
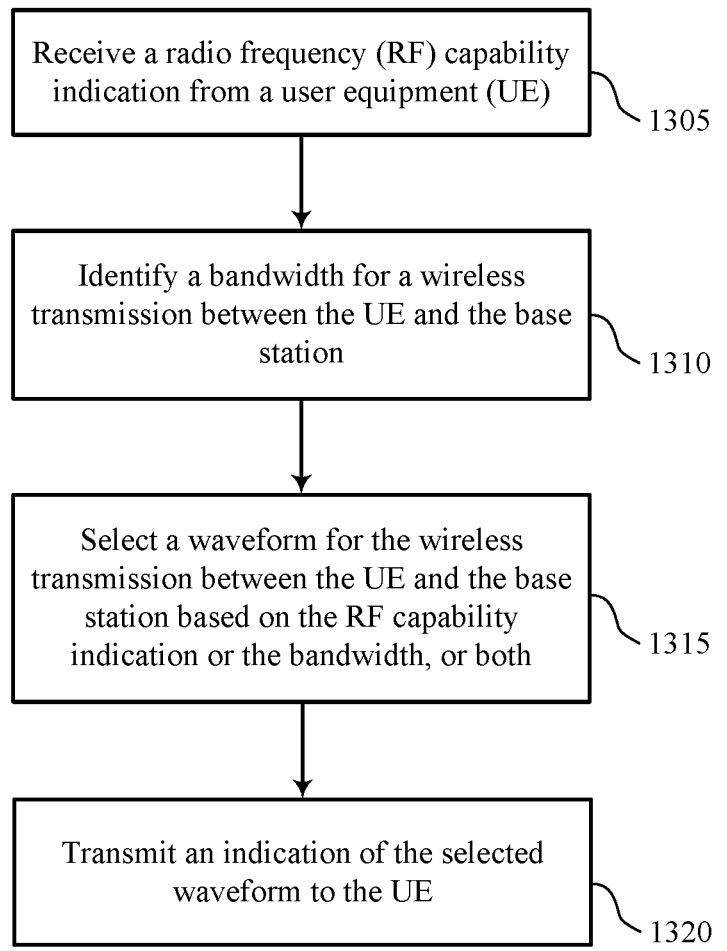
FIGS. 13 through 18 illustrate methods for waveform selection in wireless communications, in accordance with one or more aspects of the present disclosure.

FIG. 13 shows a flowchart illustrating a method 1300 for waveform selection in wireless communications in accordance with various aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may receive a RF capability indication from a UE. The operations of block 1305 may be performed according to the methods described with reference to FIGS. 1 through 4. In certain examples, aspects of the operations of block 1305 may be performed by a RF capability component as described with reference to FIGS. 5 through 8.

At block 1310 the base station 105 may identify a bandwidth for a wireless transmission between the UE and the base station 105. The operations of block 1310 may be performed according to the methods described with reference to FIGS. 1 through 4. In certain examples, aspects of the operations of block 1310 may be performed by a bandwidth identification component as described with reference to FIGS. 5 through 8.

At block 1315 the base station 105 may select a waveform for the wireless transmission between the UE and the base station based on the RF capability indication or the bandwidth, or both. The operations of block 1315 may be performed according to the methods described with reference to FIGS. 1 through 4. In certain examples, aspects of the operations of block 1315 may be performed by a waveform selection component as described with reference to FIGS. 5 through 8.

At block 1320 the base station 105 may transmit an indication of the selected waveform to the UE. The operations of block 1320 may be performed according to the methods described with reference to FIGS. 1 through 4. In certain examples, aspects of the operations of block 1320 may be performed by a waveform indication component as described with reference to FIGS. 5 through 8.

Figure 14:
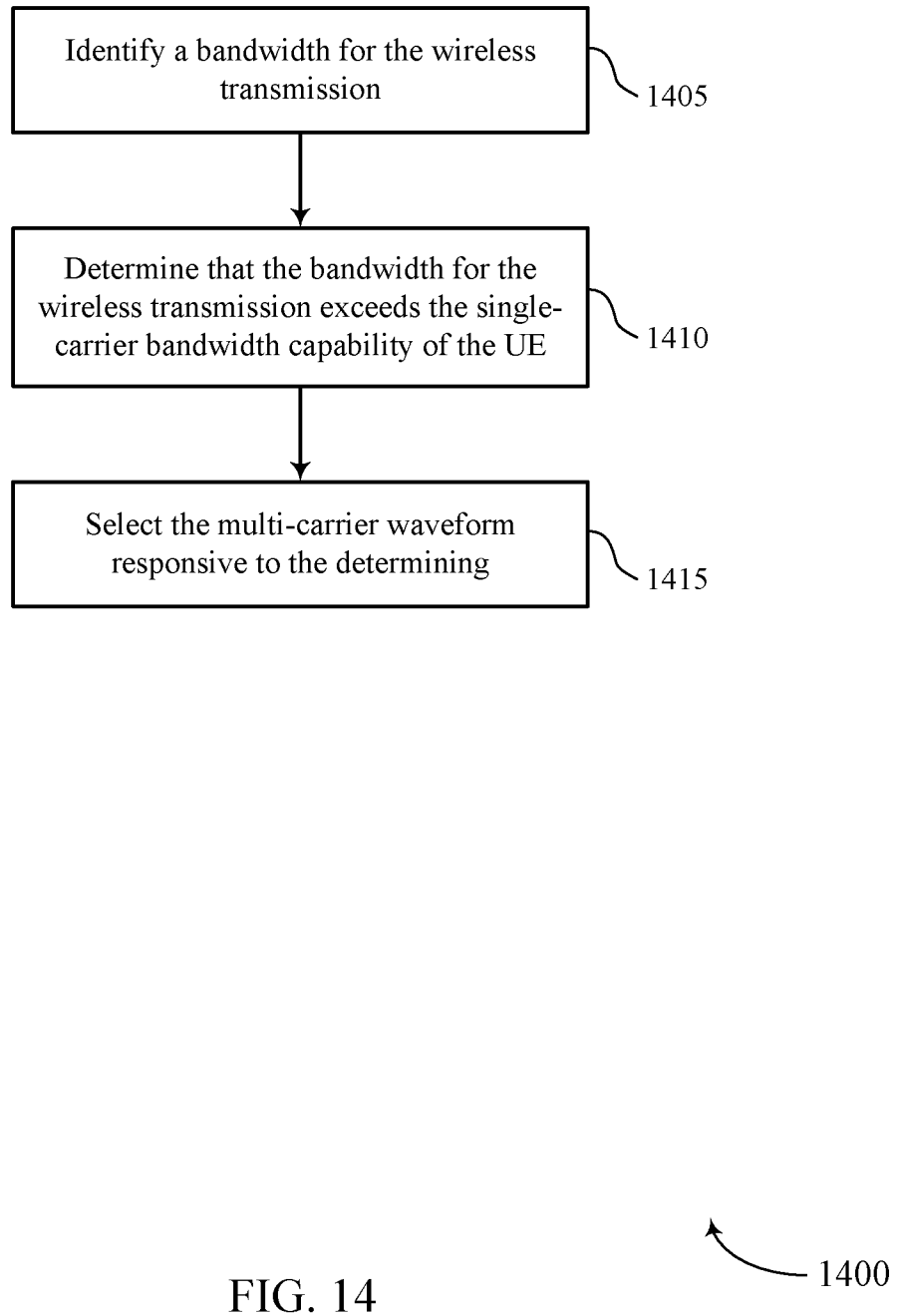

FIG. 14 shows a flowchart illustrating a method 1400 for waveform selection in wireless communications in accordance with various aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may identify a bandwidth for the wireless transmission. The operations of block 1405 may be performed according to the methods described with reference to FIGS. 1 through 4. In certain examples, aspects of the operations of block 1405 may be performed by a bandwidth identification component as described with reference to FIGS. 5 through 8.

At block 1410 the base station 105 may determine that the bandwidth for the wireless transmission exceeds the single-carrier bandwidth capability of the UE. The operations of block 1410 may be performed according to the methods described with reference to FIGS. 1 through 4. In certain examples, aspects of the operations of block 1410 may be performed by a bandwidth identification component as described with reference to FIGS. 5 through 8.

At block 1415 the base station 105 may select the multi-carrier waveform responsive to the determining. The operations of block 1415 may be performed according to the methods described with reference to FIGS. 1 through 4. In certain examples, aspects of the operations of block 1415 may be performed by a waveform selection component as described with reference to FIGS. 5 through 8.

Figure 15:
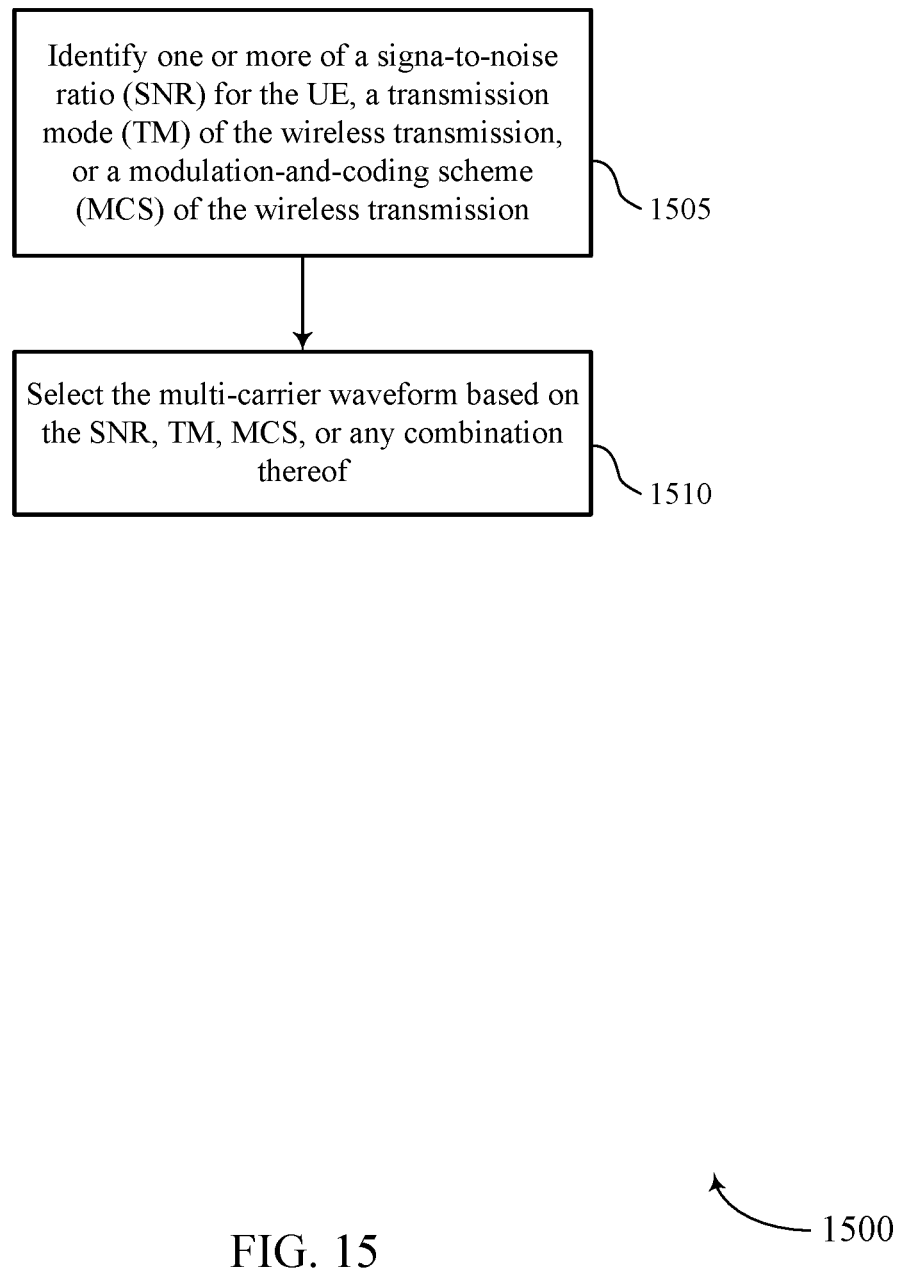

FIG. 15 shows a flowchart illustrating a method 1500 for waveform selection in wireless communications in accordance with various aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may identify one or more of a SNR for the UE, a TM of the wireless transmission, or a MCS of the wireless transmission. The operations of block 1505 may be performed according to the methods described with reference to FIGS. 1 through 4. In certain examples, aspects of the operations of block 1505 may be performed by a CQI component as described with reference to FIGS. 5 through 8.

At block 1510 the base station 105 may select the multi-carrier waveform based at least in part on the SNR, TM, MCS, or any combination thereof. The operations of block 1510 may be performed according to the methods described with reference to FIGS. 1 through 4. In certain examples, aspects of the operations of block 1510 may be performed by a waveform selection component as described with reference to FIGS. 5 through 8.

Figure 16:
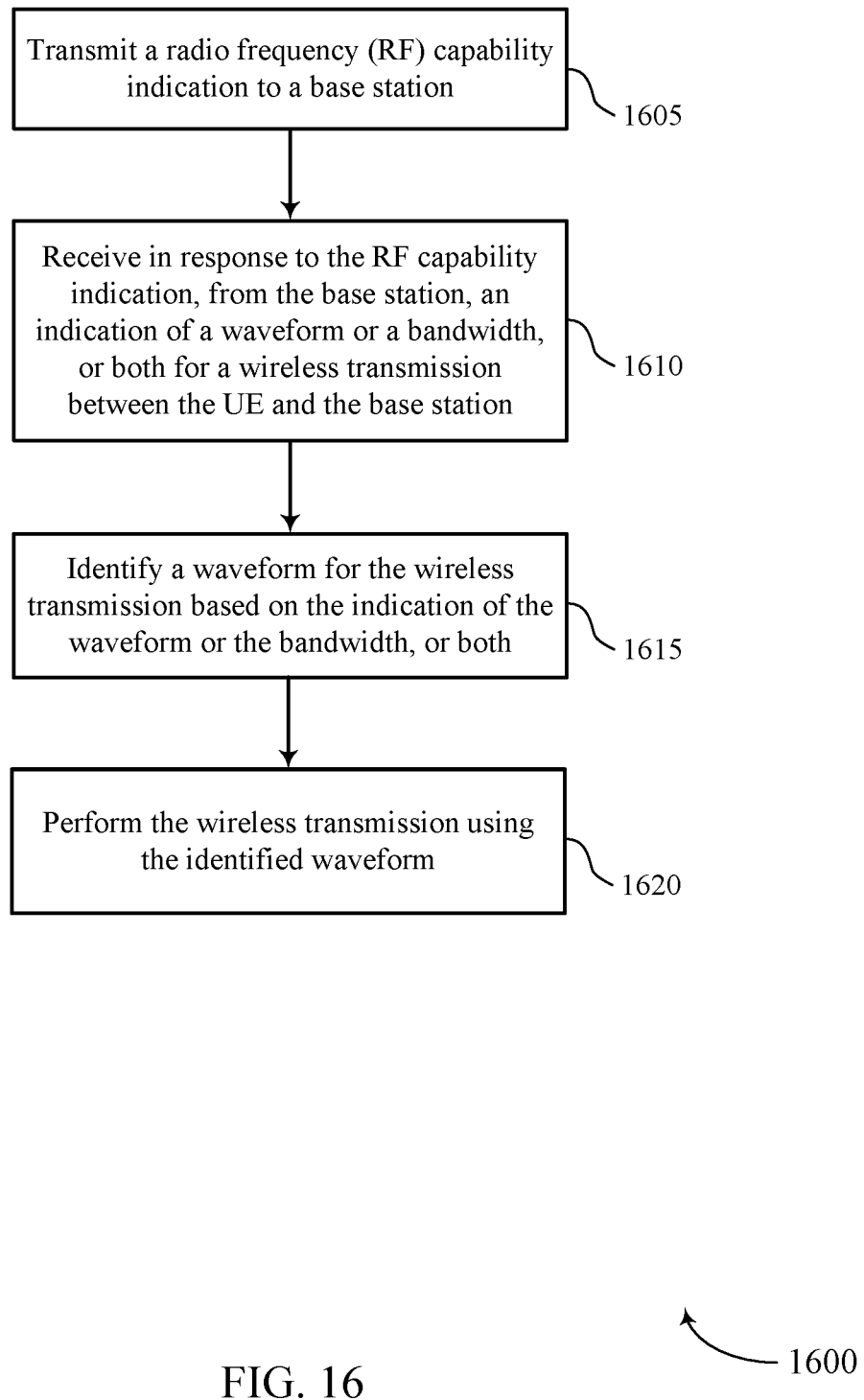

FIG. 16 shows a flowchart illustrating a method 1600 for waveform selection in wireless communications in accordance with various aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may transmit a RF capability indication to a base station. The operations of block 1605 may be performed according to the methods described with reference to FIGS. 1 through 4. In certain examples, aspects of the operations of block 1605 may be performed by a UE RF capability component as described with reference to FIGS. 9 through 12.

At block 1610 the UE 115 may receive in response to the RF capability indication, from the base station, an indication of a waveform or a bandwidth, or both for a wireless transmission between the UE 115 and base station. The operations of block 1610 may be performed according to the methods described with reference to FIGS. 1 through 4. In certain examples, aspects of the operations of block 1610 may be performed by a waveform indication component as described with reference to FIGS. 9 through 12.

At block 1615 the UE 115 may identify a waveform for the wireless transmission based on the indication of the waveform or the bandwidth, or both. The operations of block 1615 may be performed according to the methods described with reference to FIGS. 1 through 4. In certain examples, aspects of the operations of block 1615 may be performed by a bandwidth identification component as described with reference to FIGS. 9 through 12.

At block 1620 the UE 115 may perform the wireless transmission using the identified waveform. In some examples, performing the wireless transmission using the identified waveform may include transmitting using the identified waveform (e.g., via UL) or receiving using the identified waveform (e.g., via DL). The operations of block 1620 may be performed according to the methods described with reference to FIGS. 1 through 4. In certain examples, aspects of the operations of block 1620 may be performed by a transmitter as described with reference to FIGS. 9 through 12.

Figure 17:
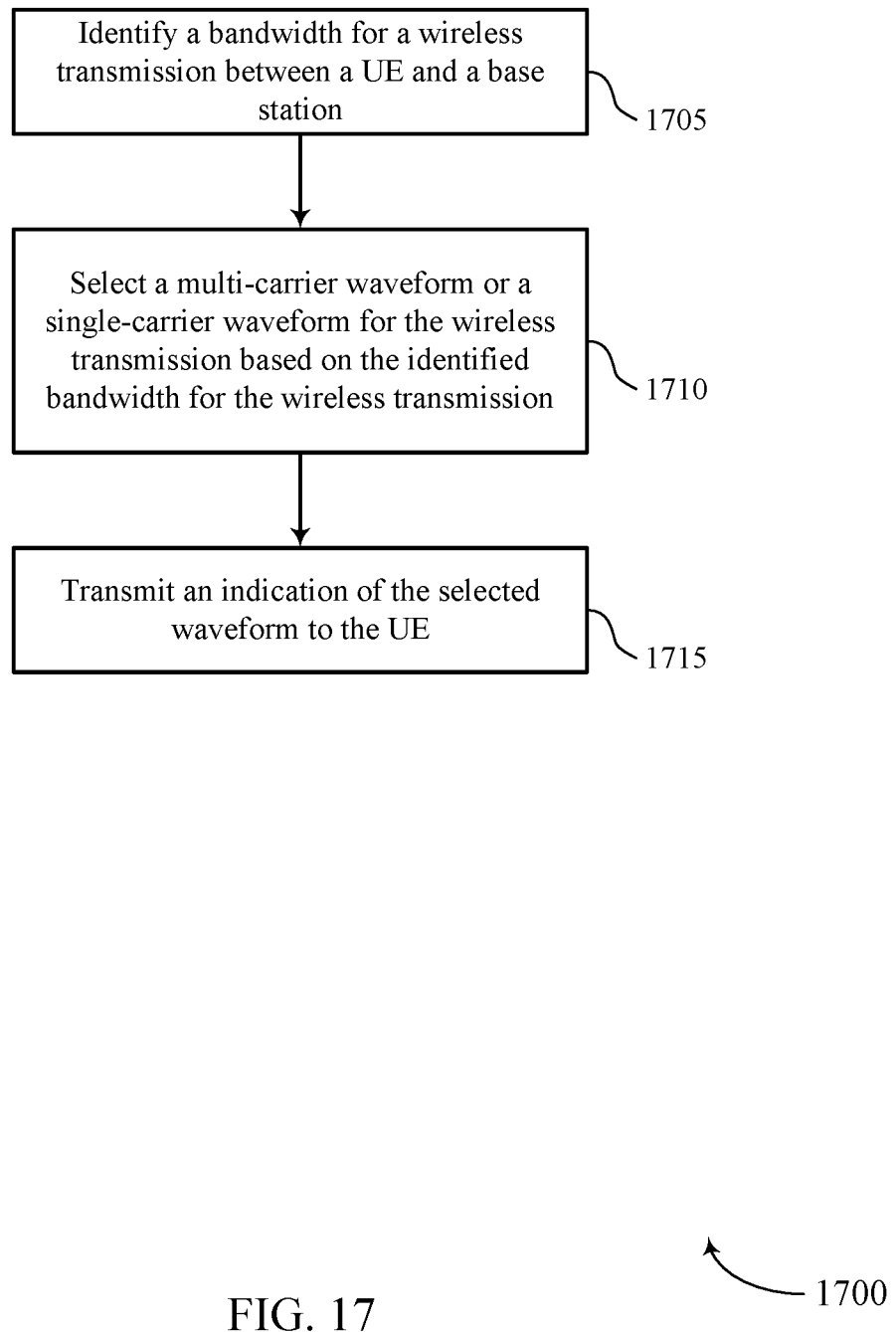

FIG. 17 shows a flowchart illustrating a method 1700 for waveform selection in wireless communications in accordance with various aspects of the present disclosure. The operations of method 1700 may be implemented by a base station 105 or its components as described herein. For example, the operations of method 1700 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may identify a bandwidth for a wireless transmission between a UE and the base station. The operations of block 1705 may be performed according to the methods described with reference to FIGS. 1 through 4. In certain examples, aspects of the operations of block 1705 may be performed by a bandwidth identification component as described with reference to FIGS. 5 through 8.

At block 1710 the base station 105 may select a multi-carrier waveform or a single-carrier waveform for the wireless transmission based at least in part on the identified bandwidth for the wireless transmission. The operations of block 1710 may be performed according to the methods described with reference to FIGS. 1 through 4. In certain examples, aspects of the operations of block 1710 may be performed by a waveform selection component as described with reference to FIGS. 5 through 8.

At block 1715 the base station 105 may transmit an indication of the selected waveform to the UE. The operations of block 1715 may be performed according to the methods described with reference to FIGS. 1 through 4. In certain examples, aspects of the operations of block 1715 may be performed by a waveform indication component as described with reference to FIGS. 5 through 8.

Figure 18:
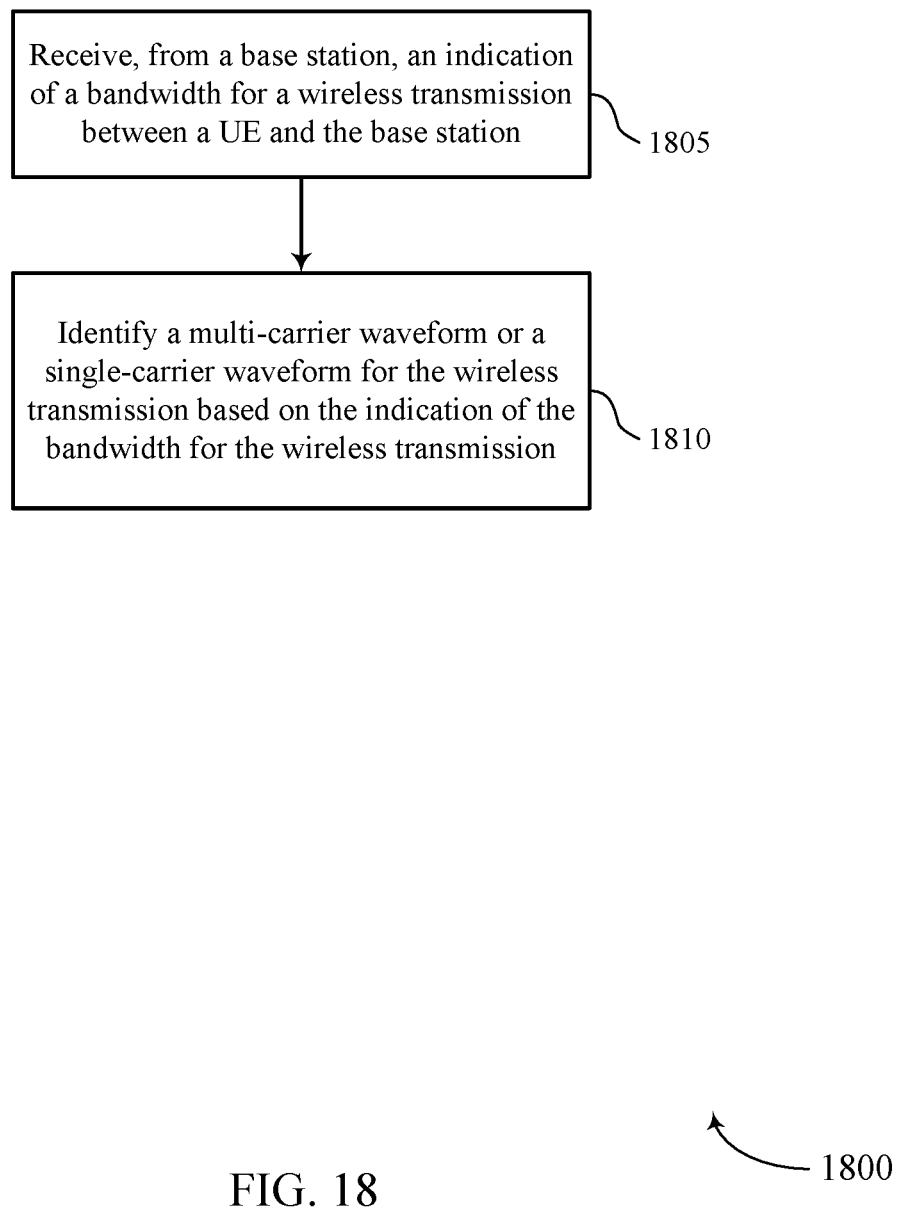

FIG. 18 shows a flowchart illustrating a method 1800 for waveform selection in wireless communications in accordance with various aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive, from a base station, an indication of a bandwidth for a wireless transmission between the UE and the base station. The operations of block 1805 may be performed according to the methods described with reference to FIGS. 1 through 4. In certain examples, aspects of the operations of block 1805 may be performed by a bandwidth identification component as described with reference to FIGS. 9 through 12.

At block 1810 the UE 115 may identify a multi-carrier waveform or a single-carrier waveform for the wireless transmission based at least in part on the indication of the bandwidth for the wireless transmission. The operations of block 1810 may be performed according to the methods described with reference to FIGS. 1 through 4. In certain examples, aspects of the operations of block 1810 may be performed by a waveform selection component as described with reference to FIGS. 9 through 12.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-A are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a radio frequency (RF) capability indication to a base station, wherein the RF capability indication comprises a capability of the UE to support a waveform and to transmit over an allocated bandwidth and wherein the RF capability indication indicates a single-carrier bandwidth capability of the UE;
   receiving, from the base station, an indication of the waveform and a bandwidth for a wireless transmission between the UE and the base station, wherein the waveform is indicated to be used over the bandwidth for the wireless transmission, and wherein the waveform and the bandwidth are based at least in part on the capability of the UE to support the waveform and to transmit over the allocated bandwidth;
   identifying the waveform for the wireless transmission based at least in part on the indication of the waveform and the bandwidth wherein the identifying the waveform for the wireless transmission comprises identifying a multi-carrier waveform based at least in part on the bandwidth for the wireless transmission exceeding the single-carrier bandwidth capability of the UE; and
   performing the wireless transmission using the identified waveform.

2. The method of claim 1, wherein the waveform is based at least in part on the RF capability indication.

3. The method of claim 1, further comprising:
   receiving the wireless transmission from the base station using the identified waveform; or
   transmitting the wireless transmission to the base station using the identified waveform.

4. The method of claim 1, wherein identifying the waveform for the wireless transmission comprises:
   determining that the bandwidth comprises two or more component carriers; and
   identifying a multi-carrier waveform based at least in part on the determining.

5. An apparatus for wireless communication, comprising:
   a processor;
   memory coupled with the processor; and
   instructions stored in the memory and operable, when executed by the processor, to cause the apparatus to:
      transmit a radio frequency (RF) capability indication to a base station, wherein the RF capability indication comprises a capability of the UE to support a waveform and to transmit over an allocated bandwidth and wherein the RF capability indication indicates a single-carrier bandwidth capability of the UE;
      receive, from the base station, an indication of the waveform and a bandwidth for a wireless transmission between the apparatus and the base station, wherein the waveform is indicated to be used over the bandwidth for the wireless transmission, and wherein the waveform and the bandwidth are based at least in part on the capability of the UE to support the waveform and to transmit over the allocated bandwidth;
      identify the waveform for the wireless transmission based at least in part on the indication of the waveform and the bandwidth wherein the identifying the waveform for the wireless transmission comprises identifying a multi-carrier waveform based at least in part on the bandwidth for the wireless transmission exceeding the single-carrier bandwidth capability of the UE;
      perform the wireless transmission using the identified waveform.

6. The apparatus of claim 5, wherein the instructions further cause the apparatus to:
   receive the wireless transmission from the base station using the identified waveform; and
   transmit the wireless transmission to the base station using the identified waveform.

7. The apparatus of claim 5, wherein the RF capability indication indicates a carrier aggregation capability of the UE for transmission of an uplink transmission.

8. The apparatus of claim 5, wherein the instructions further cause the apparatus to:
   determine that the bandwidth comprises two or more component carriers; and
   identify a multi-carrier waveform based at least in part on the determining.

* * * * *